US012194508B2

(12) United States Patent
Doughty et al.

(10) Patent No.: US 12,194,508 B2
(45) Date of Patent: Jan. 14, 2025

(54) CLEANING PAD WASHING

(71) Applicant: iRobot Corporation, Bedford, MA (US)

(72) Inventors: Brian W. Doughty, Framingham, MA (US); Leo Torrente, Somerville, MA (US); Timothy R. Ohm, Grover Beach, CA (US); Winston Heinrichs, Brighton, MA (US)

(73) Assignee: iRobot Corporation, Bedford, MA (US)

( * ) Notice: Subject to any disclaimer, the term of this patent is extended or adjusted under 35 U.S.C. 154(b) by 303 days.

(21) Appl. No.: 17/816,652

(22) Filed: Aug. 1, 2022

(65) Prior Publication Data

US 2024/0033781 A1 Feb. 1, 2024

(51) Int. Cl.

| | |
|---|---|
| ***B08B 1/12*** | (2024.01) |
| ***A47L 9/00*** | (2006.01) |
| ***A47L 9/06*** | (2006.01) |
| ***A47L 9/14*** | (2006.01) |
| ***A47L 9/28*** | (2006.01) |

(Continued)

(52) U.S. Cl.

CPC .............. *B08B 1/12* (2024.01); *A47L 9/0063* (2013.01); *A47L 9/0673* (2013.01); *A47L 9/149* (2013.01); *A47L 9/2847* (2013.01); *A47L 9/2852* (2013.01); *A47L 11/28* (2013.01); *A47L 11/4011* (2013.01); *A47L 11/4025* (2013.01); *A47L 11/4036* (2013.01); *A47L 11/4066* (2013.01); *A47L 11/4091* (2013.01); *B08B 1/20* (2024.01); *B08B 3/14* (2013.01); *B08B 5/04* (2013.01); *B08B 13/00* (2013.01); *A47L 2201/024* (2013.01);

(Continued)

(58) Field of Classification Search

CPC .... B08B 1/12; B08B 1/20; B08B 3/14; B08B 5/04; B08B 13/00; A47L 9/0063; A47L 9/0673; A47L 9/149; A47L 9/2847; A47L 9/2852; A47L 11/28; A47L 11/4011; A47L 11/4025; A47L 11/4036; A47L 11/4066; A47L 11/4091; A47L 2201/024; A47L 2201/028; A47L 2201/04; A47L 11/00; A47L 2201/02

See application file for complete search history.

(56) References Cited

U.S. PATENT DOCUMENTS

2022/0346619 A1* 11/2022 Huang ................ A47L 11/4016

FOREIGN PATENT DOCUMENTS

CN 113598663 11/2021
CN 114601378 A * 6/2022 ............. A47L 11/24

(Continued)

OTHER PUBLICATIONS

CN114699014; machine translation (Year: 2022).*

(Continued)

*Primary Examiner* — David Redding
(74) *Attorney, Agent, or Firm* — Fish & Richardson P.C.

(57) ABSTRACT

A cleaning station for a mobile robot includes a fluid vessel and a roller arranged in the fluid vessel. The fluid vessel is shaped to hold a cleaning fluid that at least partially submerges the roller. The cleaning station includes a control system configured to, when the mobile robot is docked at the cleaning station, cause rotation of the roller to direct cleaning fluid from the fluid vessel to a cleaning pad of the mobile robot in order to release debris from the cleaning pad.

37 Claims, 15 Drawing Sheets

(51) Int. Cl.

| | |
|---|---|
| ***A47L 11/28*** | (2006.01) |
| ***A47L 11/40*** | (2006.01) |
| ***B08B 1/20*** | (2024.01) |
| ***B08B 3/14*** | (2006.01) |
| ***B08B 5/04*** | (2006.01) |
| ***B08B 13/00*** | (2006.01) |

(52) U.S. Cl.
CPC ..... *A47L 2201/028* (2013.01); *A47L 2201/04* (2013.01)

(56) References Cited

FOREIGN PATENT DOCUMENTS

| | | | | |
|---|---|---|---|---|
| CN | 114699014 | * | 7/2022 | .......... A47L 11/4091 |
| CN | 114766991 A | * | 7/2022 | .......... A47L 11/4091 |
| DE | 102019213088 B | * | 2/2021 | .......... A47L 11/4047 |
| DE | 102021203332 | | 3/2022 | |

OTHER PUBLICATIONS

DE102019213088 A, machine translation (Year: 2021).*
CN114601378, machine translation (Year: 2022).*
CN114766991, machine translation (Year: 2022).*
International Search Report and Written Opinion in International Appln. No. PCT/US2023/066701, mailed on Aug. 17, 2023, 15 pages.
[No Author Listed], "Deebot X1 Turbo Instruction Manual," Ecovacs Robotics Co., Mar. 9, 2022, 52 pages.
[No Author Listed], "Ecovacs Narwhal T10, Narwal Robot Mop & Vacuum with Self-Cleaning Station User Manual," Ecovacs Robotics Co., Oct. 2017, 28 pages.
[No Author Listed], "Roborock S7 MaxV Ultra, Robotic Vacuum Cleaner User Manual," Roborock Technology Co., Jun. 18, 2022, 45 pages.

* cited by examiner

CLEANING PAD WASHING

TECHNICAL FIELD

The disclosure generally relates to washing of cleaning pads of mobile cleaning robots.

BACKGROUND

Cleaning robots include mobile robots that autonomously perform cleaning tasks within an environment, e.g., a home. Some cleaning robots hold a cleaning pad that collects debris. A cleaning robot can navigate to a docking station to charge the cleaning robot or evacuate debris from the cleaning robot.

SUMMARY

A cleaning robot can hold a cleaning pad that rubs against a floor surface and picks up debris, such as during a mopping mission. The debris becomes trapped in the cleaning pad, and the debris can be removed for re-use of the cleaning pad. To wash the cleaning pad and remove the debris, the cleaning robot and a cleaning station can engage mutually in a pad washing routine. During the pad washing routine, the cleaning robot docks at the cleaning station, and a roller of the cleaning station engages with the cleaning pad on the robot. The roller on the cleaning station draws cleaning fluid from a fluid vessel and forces the cleaning fluid through the cleaning pad on the robot, hydraulically removing trapped debris in conjunction with mechanical agitation. In some cases, relative translation of the cleaning pad and the roller can aid debris removal.

In some aspects, this disclosure describes a cleaning station for a mobile robot. The cleaning station includes a housing, a fluid vessel mounted in the housing, and a roller arranged in the fluid vessel. The fluid vessel is shaped to hold a cleaning fluid that at least partially submerges the roller. The cleaning station includes a control system configured to, when the mobile robot is docked at the cleaning station, cause rotation of the roller to direct cleaning fluid from the fluid vessel to a cleaning pad of the mobile robot in order to release debris from the cleaning pad.

In some aspects, this disclosure describes a cleaning station for a mobile robot. The cleaning station includes a fluid vessel and a roller arranged in the fluid vessel. The fluid vessel is shaped to hold a cleaning fluid that at least partially submerges the roller. The cleaning station includes a control system configured to, when the mobile robot is docked at the cleaning station, cause rotation of the roller to direct cleaning fluid from the fluid vessel to a cleaning pad of the mobile robot in order to release debris from the cleaning pad These and other described cleaning stations can have one or more of at least the following characteristics.

In some implementations, the roller is translatable with respect to the mobile robot during rotation of the roller.

In some implementations, the cleaning station includes a translation mechanism attached to the fluid vessel, the translation mechanism operable to translate the roller with respect to the mobile robot during rotation of the roller.

In some implementations, the cleaning station includes a docking surface to receive the mobile robot. The fluid vessel is arranged in a recess in the docking surface.

In some implementations, the roller is arranged to contact the cleaning pad, and the docking surface has a length that permits movement of the mobile robot through an extent of the cleaning pad when the mobile robot is docked at the cleaning station with the roller in contact with the cleaning pad.

In some implementations, the control system is configured to rotate the roller such that a portion of the roller proximate the cleaning pad moves in a direction opposite a direction of relative translation between the roller and the cleaning pad.

In some implementations, the roller includes at least one of: one or more fletches extending along a length of a surface of the roller, one or more nubs protruding from the surface of the roller, or one or more lobes that smoothly distort the surface of the roller.

In some implementations, the roller includes an elastomer.

In some implementations, the roller is arranged to contact the cleaning pad when the mobile robot is docked at the cleaning station.

In some implementations, the cleaning station includes a spring-loaded mounting in which the roller is mounted. The spring-loaded mounting is arranged to bias the roller against the cleaning pad.

In some implementations, the rotation of the roller causes the cleaning fluid to return to the fluid vessel after being directed to the cleaning pad.

In some implementations, the cleaning station includes a conduit fluidically coupled to the fluid vessel. In a cleaning cycle, the control system is configured to: cause the cleaning fluid to flow into the fluid vessel, and cause the cleaning fluid to be withdrawn from the fluid vessel through the conduit after the cleaning fluid has been forced through the cleaning pad.

In some implementations, the cleaning station includes a vacuum source arranged to apply a vacuum to withdraw the cleaning fluid from the fluid vessel.

In some implementations, when the control system causes the cleaning fluid to be withdrawn, the vacuum source generates a negative pressure between 5 kPa and 30 kPa with respect to the fluid vessel.

In some implementations, the cleaning fluid is withdrawn through the conduit at a velocity between 0.5 m/s and 4.0 m/s.

In some implementations, the cleaning station includes a septum disposed in the conduit, the septum having a size that limits a size of debris flowing through the conduit.

In some implementations, the cleaning station includes a sensor disposed in the fluid vessel and communicatively coupled to the control system, the sensor configured to measure a contamination level of the cleaning fluid in the fluid vessel. The control system is configured to cause the cleaning fluid to be withdrawn from the fluid vessel in response to the contamination level being above a threshold value.

In some implementations, the control system is configured to repeat the cleaning cycle until the cleaning cycle has repeated a threshold number of cycles or a threshold volume of the cleaning fluid has passed across the cleaning pad. The threshold number of cycles or the threshold volume of the cleaning fluid is based on at least one of: a duration of cleaning performed by the mobile robot, an area of an environment cleaned by the mobile robot, a type of cleaning performed by the mobile robot, a time duration that a floor area was not cleaned by the mobile robot, a soil level detected by the mobile robot, a type of room cleaned by the mobile robot, a current season, or current or past weather.

In some implementations, the cleaning station includes a sensor disposed in the fluid vessel and communicatively coupled to the control system. The sensor is configured to measure a contamination level of the cleaning fluid in the fluid vessel. The control system is configured to repeat the cleaning cycle until the contamination level is below a threshold value at a predetermined time during the cleaning cycle.

In some implementations, the control system is configured to cause the cleaning fluid to flow into the fluid vessel until between 15% and 50% of a height of the roller is submerged in the cleaning fluid.

In some implementations, the cleaning station includes a waste tank fluidically coupled to the fluid vessel, a dry debris canister, a vacuum source, and a valve. In a first configuration of the valve, the valve fluidically couples the vacuum source to the waste tank, such that a vacuum applied by the vacuum source draws the cleaning fluid from the fluid vessel into the waste tank. In a second configuration of the valve, the valve fluidically couples the vacuum source to the dry debris canister, such that the vacuum applied by the vacuum source draws dry debris stored in the mobile robot into the dry debris canister.

In some implementations, the cleaning station includes a waste tank, a vacuum source, a valve. In a first configuration of the valve, the valve fluidically couples the waste tank to the fluid vessel, such that a vacuum applied by the vacuum source draws the cleaning fluid from the fluid vessel into the waste tank. In a second configuration of the valve, the valve fluidically couples the vacuum source to an evacuation port of the mobile robot, such that the vacuum applied by the vacuum source draws dry debris stored in the mobile robot into the waste tank.

In some implementations, the cleaning station includes a waste tank fluidically coupled to the fluid vessel, a solid waste canister fluidically coupled to the fluid vessel; a vacuum source; and a filter. The filter is arranged to receive a mixture of the debris and the cleaning fluid from the fluid vessel, direct the debris into the solid waste canister, and direct the cleaning fluid into the waste tank.

In some implementations, the roller is a first roller, and the cleaning station includes a second roller disposed in the fluid vessel or disposed in a second fluid vessel of the cleaning station.

Some aspects of the present disclosure describe a mobile cleaning robot. The mobile cleaning robot includes a drive system to maneuver the mobile cleaning robot about an environment during a cleaning mission; a pad holder to receive a fabric pad for removing debris from a floor surface and trapping the debris; and a control system. The control system is configured to: dock the mobile cleaning robot at a docking station for cleaning the fabric pad in a pad washing routine, and cause the fabric pad to move with respect to the docking station during the pad washing routine.

This and other described mobile cleaning robots can have one or more of at least the following characteristics.

In some implementations, the mobile cleaning robot includes a translation mechanism attached to the pad holder, the translation mechanism operable to translate the fabric pad with respect to the docking station.

In some implementations, causing the fabric pad to move with respect to the docking station includes causing the drive system to maneuver the mobile cleaning robot with respect to the docking station.

In some implementations, causing the fabric pad to move with respect to the docking station includes causing the fabric pad to move with respect to the docking station in response to receiving an instruction from the docking station.

Some aspects of the present disclosure describe a system. The system includes a cleaning station including a roller; and a mobile robot including a pad holder to receive a fabric pad for removing debris from a floor surface and trapping the debris. The roller is arranged to contact the fabric pad when the mobile robot is docked at the cleaning station for a pad washing routine. At least one of the cleaning station or the mobile robot is configured to cause relative translation between the fabric pad and the roller during the pad washing routine. One or more components of the system can have one or more of the characteristics described for the foregoing cleaning stations and mobile cleaning robot.

These and other features of the cleaning station and/or cleaning robot can provide one or more advantages. Hydraulic cleaning, in combination with agitation of the cleaning pad by the roller, can provide more effective debris removal than some washing schemes. For example, small debris may be more likely to be removed from fibers of the cleaning pad, and an overall proportion of debris that is removed can be increased. Roller action in conjunction with relative translation of the cleaning pad and the roller can further aid debris removal. In addition, pad washing using a roller in a fluid vessel can effectively limit the dispersal of cleaning fluid (including dirty fluid) and debris on the cleaning station, making manual cleanup easier or unnecessary. Overall cleaning fluid usage can be reduced, and user experience can be improved.

The details of one or more implementations are set forth in the accompanying drawings and the written description. Other features, objects, and advantages will be apparent from the description, drawings, and the claims.

DESCRIPTION OF DRAWINGS

Like reference symbols in the various drawings indicate like elements.

DETAILED DESCRIPTION

Figure 1A:
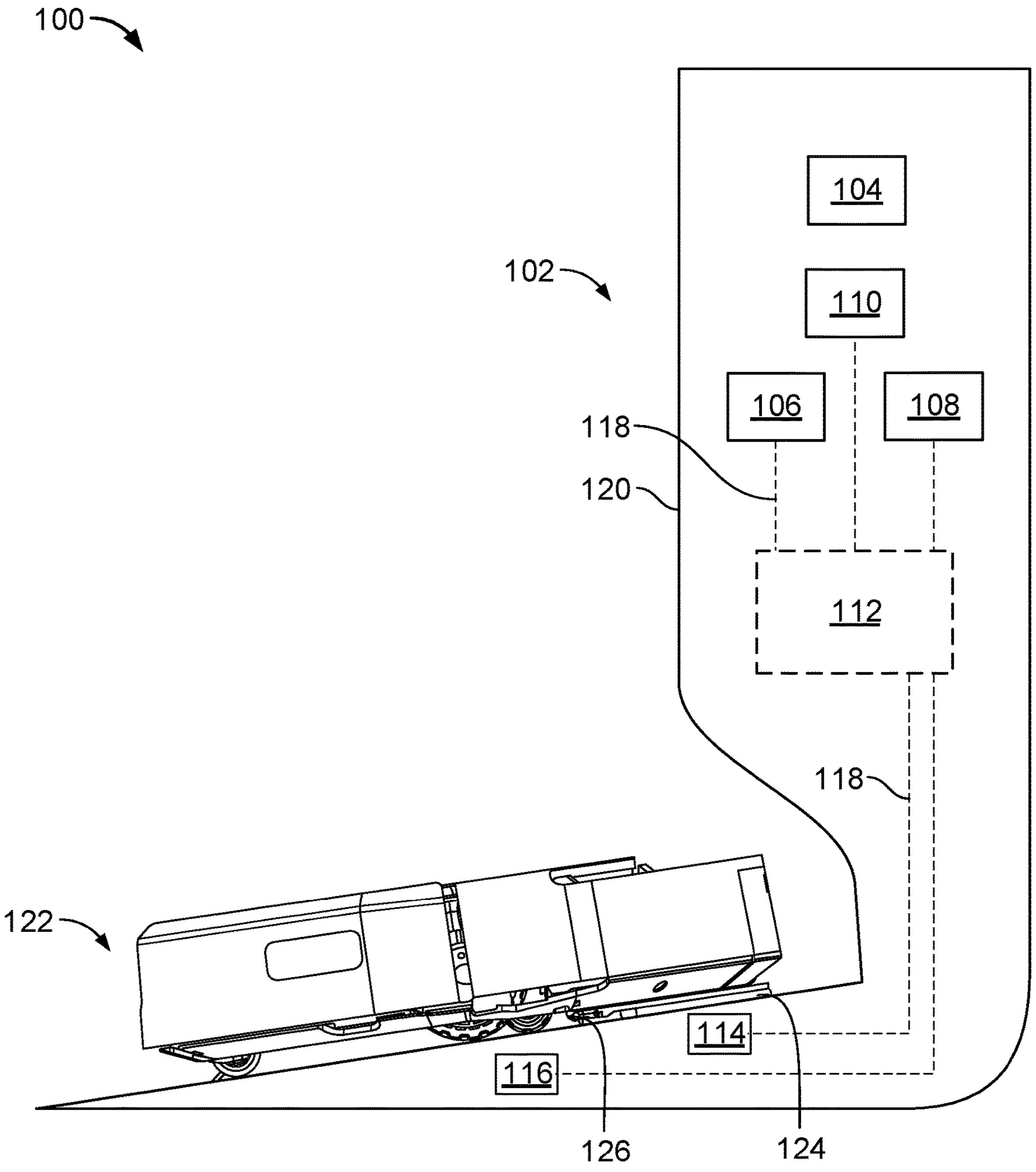
FIG. 1A is diagram illustrating an example of a mobile cleaning robot docking on a cleaning station.

Described herein are approaches to washing the cleaning pad of cleaning robots. As a cleaning robot, such as a mobile cleaning robot, navigates about an environment, the robot holds a cleaning pad that contacts a floor surface and collects debris. When the robot docks at a cleaning station, the cleaning station operates to remove the debris and allow the cleaning pad to be re-used. According to some implementations of this disclosure, the cleaning station includes a fluid vessel and a roller in the fluid vessel. The roller is at least partially submerged in a cleaning fluid held by the fluid vessel, and rotation of the roller forces the cleaning fluid to and through the cleaning pad of a docked robot. The hydraulic force of the cleaning fluid, in combination with physical agitation of the cleaning pad, forces the debris out of the cleaning pad and into the fluid vessel, allowing the cleaning pad to be re-used. In some implementations, the roller, the robot, and/or the cleaning pad can translate during the cleaning, improving cleaning effectiveness.

As shown in FIG. 1, a system 100 includes a cleaning station 102 and a cleaning robot 122. The robot 122 includes a pad holder 126 holding a cleaning pad 124, such as a fabric pad. During a cleaning mission, such as a dry cleaning mission (e.g., dusting or sweeping) or a wet cleaning mission (e.g., mopping), the robot 122 navigates along a floor surface, and debris from the floor surface is collected in the cleaning pad 124. After one or more cleaning missions, and/or during a cleaning mission, the robot 122 returns to and docks at the cleaning station 102. For example, the robot 122 can return to the cleaning station 102 in response to completing a cleaning mission, in response to completing a predetermined portion of a cleaning mission, in response to completing a predetermined number of cleaning missions or cleaning for a predetermined period of time during a cleaning mission or across multiple cleaning missions, in response to a command send to the robot 122 by a user device or by the cleaning station 102, in response to a battery level of the robot 122 dropping below a threshold value, in response to a debris level of the robot exceeding a threshold value, or based on another reason.

Figure 1B:
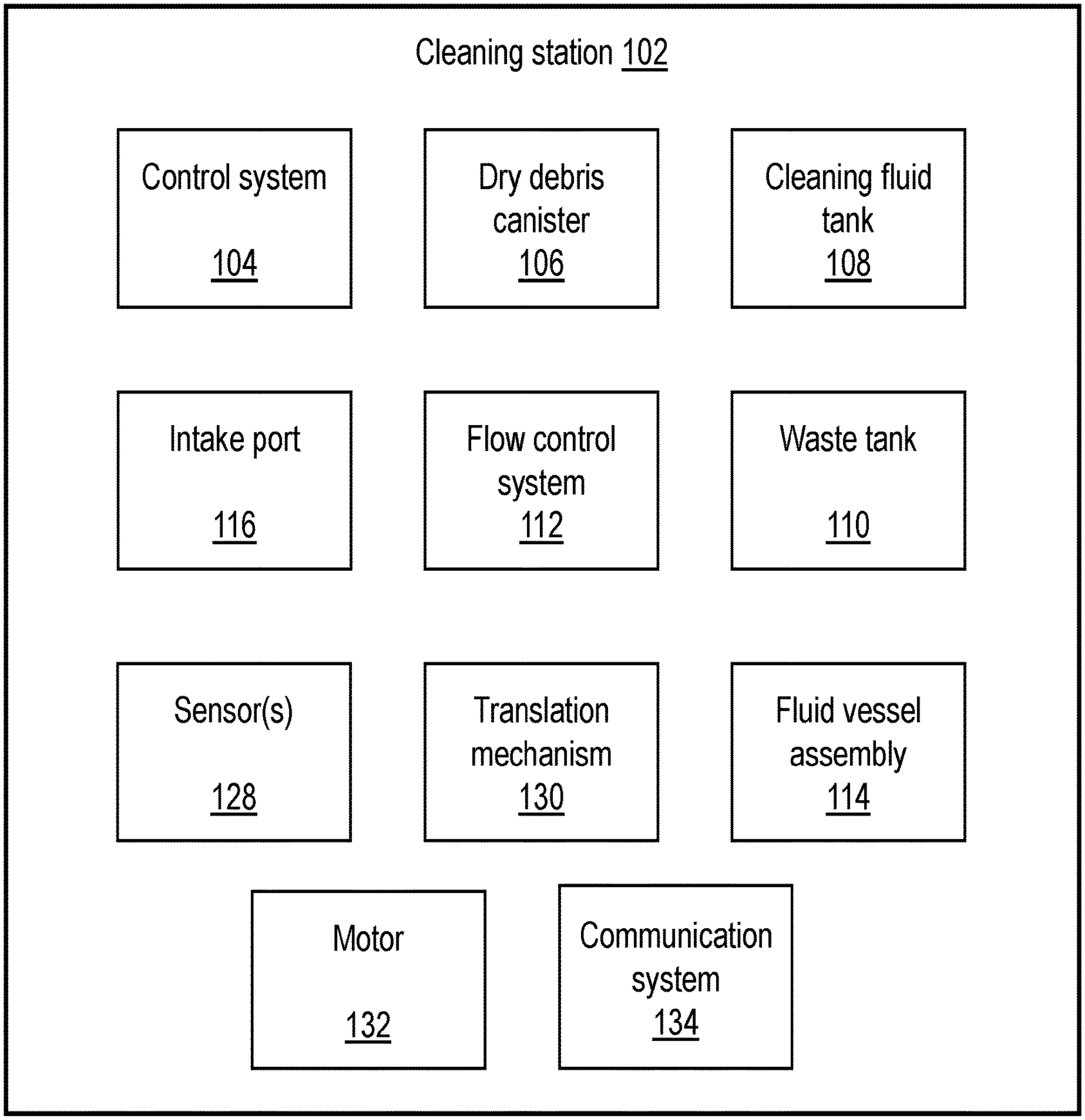
FIG. 1B is a diagram illustrating components of an example of a cleaning station.

When the robot 122 is docked at the cleaning station 102, components of the cleaning station 102 operate to wash the cleaning pad 124. Examples of components of the cleaning station 102 are illustrated in FIGS. 1A-1B; in various implementations, the cleaning station can include some or all of these components, in different combinations. The components of the cleaning station 102 can be mounted in an overall housing 120 of the cleaning station, which can include one or more portions to provide structural support to the components and maintain the components in respective positions. In some implementations, the housing 120 can support docking of the robot 122 on the housing 120, e.g., on a ramp or other docking surface of the housing 120.

In some implementations, the cleaning station 102 includes a control system 104, such as a computing system. The control system 104 is configured to read data from and/or transmit data (e.g., commands) to one or more other components of the cleaning station 102, such as to obtain sensor readings from sensors 128 of the control system and/or to cause the components of the cleaning station 102 to operate, as discussed in reference to various examples below. In some implementations, the control system 104 is configured to communicate with the robot 122, e.g., using a communication system 134. For example, the control system 104 can be configured to transmit a command to the robot 122 to cause the robot 122 to dock at the cleaning station 102; to transmit a command to the robot 122 to cause the robot 122 to initiate or terminate an operation associated with pad washing (e.g., to cause the robot 122 to move with respect to a roller of the cleaning station 102 and/or to cause the robot 122 to move the cleaning pad 124 with respect to the roller; and/or to receive data from the robot 122, e.g., indicating that the robot 122 will initiate docking or indicating a direction of translation of the cleaning pad 124 mounted on the robot 122. In some implementations, the control system 104 is configured to communicate with a user device, such as a mobile phone, a tablet, or a computer, using the communication system 134. For example, the control system 104 can receive commands from the user device to cause the cleaning station 102 to perform pad washing or modify one or more parameters of the pad washing. As another example, the control system 104 can transmit, to the user device, data that causes the user device to display a current status of pad washing, e.g., a measured debris level or an indication that pad washing has completed.

The control system 104 is configured to control components of the cleaning station 102 to perform pad washing. For example, the control system 104 can: provide signals to the motor 132 to cause the motor 132 to rotate the roller in a particular direction; provide signals to the translation mechanism 130, or to a motor coupled to the translation mechanism 130, to cause translation of the fluid vessel assembly 114 (or a portion thereof) with respect to a cleaning robot; and/or provide signals to the flow control system 112 (e.g., blower(s), pump(s), and/or valve(s) of the flow control system 112) to flow cleaning fluid into the fluid vessel, evacuate cleaning fluid and waste from the fluid vessel, and/or draw dry debris from a cleaning robot into a dry debris canister 106.

Figure 2A:
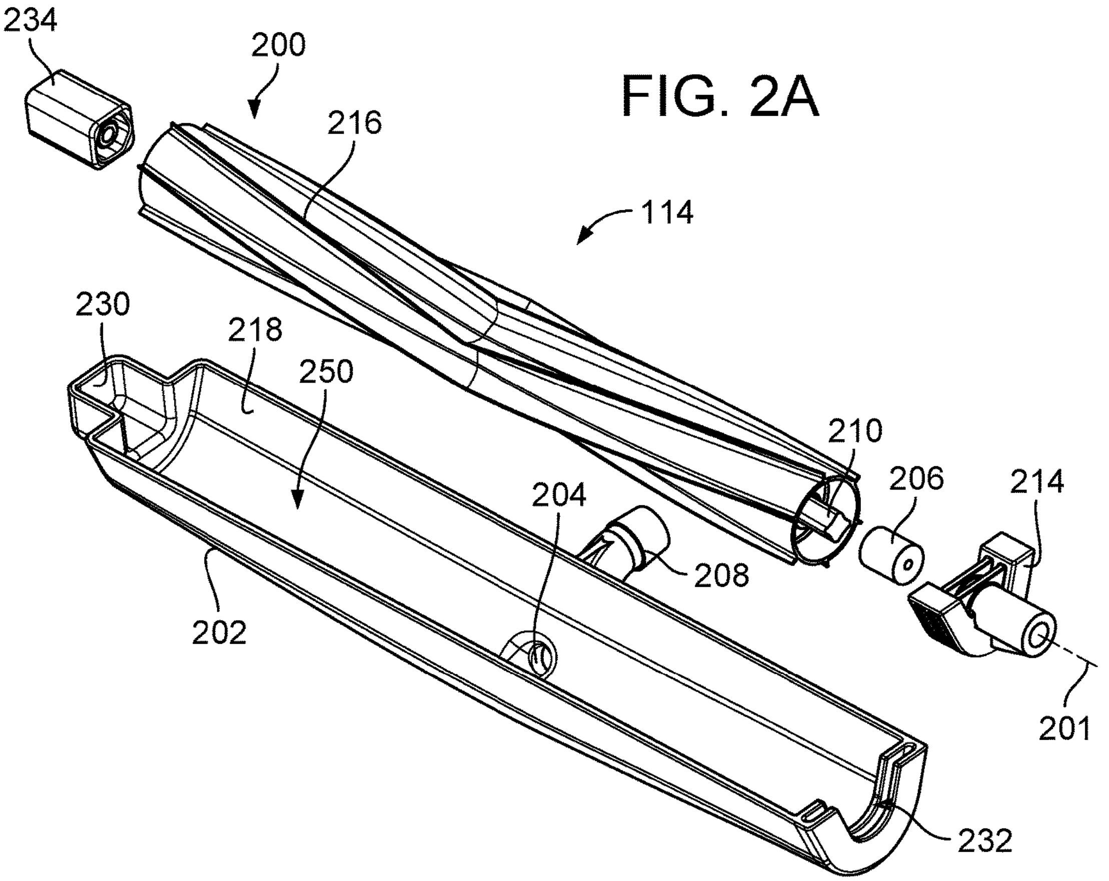
FIGS. 2A-2B are exploded-view and profile view diagram illustrating an example of a fluid vessel assembly.
Figure 2B:
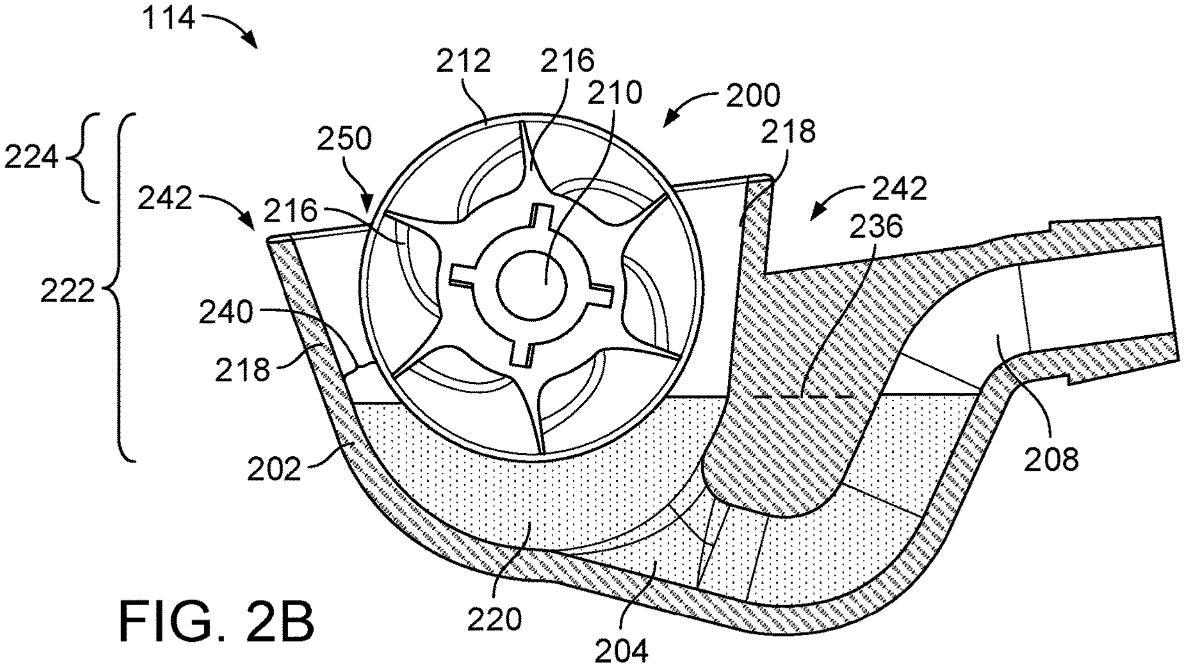

A fluid vessel assembly 114, discussed in further detail at least with respect to FIGS. 2A-2B, includes one or more rollers and one or more fluid vessels. The fluid vessel holds a cleaning fluid that is drawn from the fluid vessel and forced through the cleaning pad 124 to release debris into the fluid vessel. The cleaning fluid and debris can then be evacuated from the fluid vessel.

The cleaning station 102 can include one or more tanks/canisters. A cleaning fluid tank 108 holds unused cleaning fluid that can be provided into the fluid vessel of the fluid vessel assembly 114 and used to wash a cleaning pad. A dry debris canister 106 collects dry debris evacuated from the robot, e.g., dry debris vacuumed by the robot. A waste tank 110 holds used cleaning fluid (e.g., cleaning fluid contaminated with debris) after the cleaning fluid has been forced through the cleaning pad 124 and evacuated from the fluid vessel. In some implementations, the waste tank 110 holds at least some solid debris removed from the cleaning pad 124 and evacuated with the used cleaning fluid. In some implementations, as described in reference to FIG. 14, the dry debris canister 106 and the waste tank 110 are combined in a joint waste tank that holds both solid debris and dirty cleaning fluid.

A flow control system 112 includes components for transporting cleaning fluid and debris between components of the cleaning station 102. For example, the flow control system 112 can include one or more vacuum and/or pressure sources, such as pumps and/or blowers, to cause cleaning fluid and/or debris flow. In some implementations, the flow control system 112 includes one or more valves (e.g., adjustable valves) that can be switched (e.g., by the control system 104) between multiple configurations to alter flow rates and/or flow paths of cleaning fluid and/or debris. The flow control system 112 can include pipes, tubes, and/or other conduits 118, illustrated in FIG. 1A, the conduits 118 arranged to transport the cleaning fluid and debris as directed by the vacuum and/or pressure sources. For example, in some implementations, the conduits 118 fluidically couple the cleaning fluid tank 108 to the fluid vessel to transport cleaning fluid into the fluid vessel. In some implementations, the conduits 118 fluidically couple the fluid vessel to the waste tank 110 to transport used cleaning fluid and/or debris into the waste tank 110. In some implementations, the conduits 118 fluidically couple the intake port 116 to the dry debris canister 106 or the waste tank 110 to transport solid debris from an intake port 116 to the dry debris canister 106 or the waste tank 110. The connections of the conduits 118 illustrated in FIG. 1A are merely exemplary; other arrangements are also within the scope of this disclosure, to transport cleaning fluid and debris between components as described herein.

In some implementations, the cleaning station 102 includes an intake port 116. As discussed in further detail with respect to FIGS. 5 and 13-14, the intake port 116 is arranged to interface with an exhaust port of the robot 122 to receive dry debris from the robot 122. The dry debris can then be transported to the dry debris canister 106 or the waste tank 110 for storage and eventual removal.

In some implementations, the cleaning station 102 includes one or more sensors 128. As described in further detail with respect to FIGS. 3A-3D, in some implementations, the sensors 128 include a sensor configured to measure a contamination level of cleaning fluid in the fluid vessel. In some implementations, the sensors 128 include a sensor configured to detect whether the robot 122 is docked at the cleaning station 102. In some implementations, the sensors 128 include one or more sensors to detect fill levels of one or more of the tanks/canisters 106, 108, 110. In some implementations, the sensors 128 include one or more sensors to detect large debris, e.g., based on measurement of rotation of the roller. Output(s) of the sensors 128 (e.g., electrical signals or digital data) can be transmitted to the control system 104, and the control system 104 can be configured to perform operations in response to the sensor output.

In some implementations, as described in further detail with respect to FIGS. 6A-8B, the cleaning station 102 includes a translation mechanism 130. The translation mechanism 130 can translate all or a portion of the fluid vessel assembly 114 with respect to the robot 122 during cleaning of the cleaning pad 124, which can enhance an effectiveness of the cleaning.

In some implementations, the cleaning station 102 includes a motor 132 to drive rotation of the roller of the fluid vessel assembly 114. For example, the motor 132 can be an AC brushless motor, a DC brushed or brushless motor, a direct drive motor, or a rotary servo motor.

In some implementations, the cleaning station 102 includes a communication system 134 configured to send and receive signals to one or more other devices, such as a cleaning robot, a user device, and/or a remote computing system (e.g., a cloud computing system). For example, the communications system 134 can transmit and receive wireless signals, such as short-range signals (e.g., Bluetooth), mid-range signals (e.g., Wi-Fi), and/or cellular network signals.

The cleaning station need not include all of the components illustrated in FIG. 1B. Moreover, in some implementations the cleaning station includes additional components/functionality. For example, in some implementations the cleaning station includes a charging component to charge the cleaning robot 122 when the robot 122 is docked at the cleaning station.

As shown in FIG. 2A, an example of a fluid vessel assembly 114 includes a roller 200 and a fluid vessel 202. The fluid vessel 202 is sized and shaped to receive the roller 200 and can have, for example, an open curved cross-section (e.g., an open semicircle) or an open rectangular cross section, the cross-section defined by sidewalls 218 of the fluid vessel 202. The sidewalls 218 at least partially define a reservoir 250 that (i) receives and holds the cleaning fluid 220 and (ii) receives at least a portion of the roller 200. At least one orifice 204 is provided in the fluid vessel 202, the at least one orifice 204 leading to at least one conduit 208 that fluidically couples the fluid vessel 202 to one or more components of the cleaning station 102. The fluid vessel 202 can be composed of a suitable material, such as a plastic, that is resistant to cleaning fluid.

As shown in FIGS. 2A-2B, the roller 200 is an elongated body rotatable about a central axis 201 and having a size and shape such that the roller 200 fits at least partially within the fluid vessel 202. In some implementations, the roller 200 and the fluid vessel 202 are sized and shaped such that, when the roller 200 is mounted in position for rotation within the fluid vessel 202, at least a portion of the roller 200 is positioned within the fluid vessel 202 (so that fluid is directed back into the fluid vessel 202 during operation) and at least a portion of the roller 200 is exposed above a cross-sectional area of the fluid vessel 202 (so as to contact a cleaning pad without obstruction by the fluid vessel 202). For example, as shown in FIG. 2B, the roller 200 has a diameter 222, of which a portion 224 (e.g., between 10% and 50% of the diameter 222) is exposed above the fluid vessel 202.

As shown in FIG. 2B, the roller 200 has a substantially tubular shape. A tubular body 212 of the roller 200 has a circular cross-section. In some implementations, the roller 200 includes surface features that can protrude from the tubular body 212, such as fletches 216. Such features can increase agitation of the cleaning pad and/or can cause more cleaning fluid to be pushed through the cleaning pad by the roller 200, improving debris removal, and are discussed in more detail with respect to FIGS. 4A-4C. In some implementations, the roller 200 has a length between 7 cm and 35 cm. The roller 200 can be rigid (e.g., composed of a rigid plastic) and/or flexible (e.g., composed of an elastomeric material).

To provide for rotation of the tubular body 212, the roller 200 includes a shaft 210 attached to a bearing 206 that fits in a bearing retainer 214 and rotates by torque applied by a motor of the cleaning station (such as motor 132). In some implementations, the fluid vessel 202 includes a cutout 232 at one or both axial ends of the fluid vessel 202. One or more components associated with torque transmission to the roller 200, such as the bearing 206, can be arranged to pass through the cutout 232 to facilitate the torque transmission from the motor, which may be arranged outside the fluid vessel 202. In some implementations, as shown in the example of FIG. 2A, a fixed mounting 234 receives an end of the shaft 210 opposite the end (having the bearing 206)

through which torque is transmitted to the shaft 210. In some implementations, the fluid vessel 202 includes a holder 230 to receive the fixed mounting 234.

As shown in FIG. 2B, cleaning fluid 220 can be provided into the fluid vessel 202 (e.g., through the orifice 204 or through one or more separate inlet orifices) to at least partially submerge the roller 200. The orifice 204 is arranged at a bottom portion of the fluid vessel 202, which facilitates subsequent removal of debris (which may collect at the bottom of the fluid vessel 202) from the fluid vessel 202, as discussed in further detail below. In some implementations, as shown in FIG. 2B, the conduit 208 is shaped so that, in reference to a fluid level 236 of cleaning fluid 220 provided into the fluid vessel 202 for each cleaning cycle, the conduit 208 reaches the fluid level 236 within a relatively short distance from the orifice 204. This can reduce an amount of cleaning fluid 220 in the conduit 208 but outside the fluid vessel 202 during pad washing, which may represent unnecessary cleaning fluid that does not substantially contribute to washing, because the cleaning fluid inside the conduit 208 also reaches the fluid level 236. For example, the conduit 208 can reach the fluid level 236 within a conduit length of 6 cm, 5 cm, 4 cm, or 3 cm from the orifice 204.

In some implementations, the roller 200 and the fluid vessel 202 have respective shapes and sizes that together increase an amount of cleaning fluid forced through the washing pad and/or increase a velocity of the cleaning fluid forced through the washing pad. For example, a short distance between the roller 200 and the sidewalls 218 for at least a portion of the sidewalls 218 can cause more cleaning fluid to be moved by rotation of the roller 200 and/or cause the cleaning fluid to be moved at a faster velocity. In some implementations, the shortest distance 240 between the roller 200 and the sidewalls 218 is between 1 mm and 10 mm. In some implementations, the sidewalls 218 are shaped to generally follow the curve of the roller 200, e.g., such that the distance between the sidewalls 218 and the roller 200 is maintained at less than 10 mm over an angular range (with respect to the central axis 201 of the roller 200) of between 45° and 120° or between 60° and 120°. In some implementations, the sidewalls 218 are shaped to flare out, with respect to the roller 200, in proximity to the opening in the fluid vessel 202 through which a portion of the roller 200 is exposed. For example, as shown in FIG. 2B, the distance between the roller 200 and the sidewalls 218 increases near the top 242 of the fluid vessel 202, on both sides of the fluid vessel 202, compared to further from the top 242. In some implementations, this feature (which can be included on one or both sides of the fluid vessel 202) can increase an amount of cleaning fluid that is captured back in the fluid vessel 202 after being forced through the cleaning pad, improving cleaning station cleanliness.

Figure 3A:
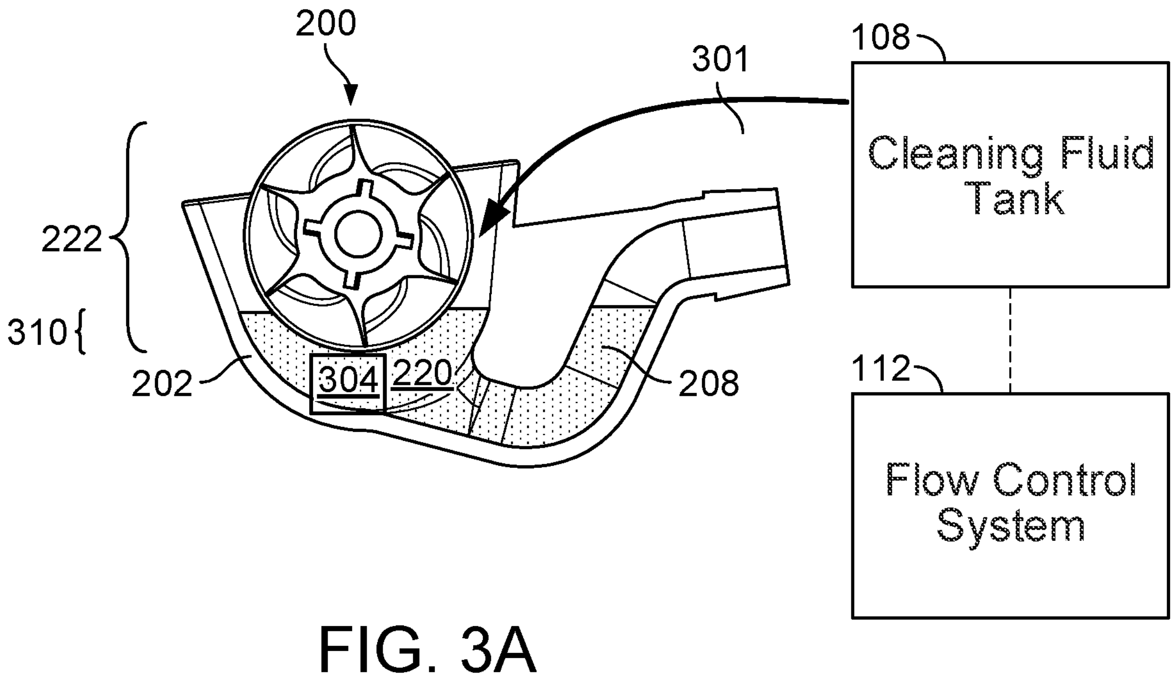
FIGS. 3A-3D are diagrams illustrating an example of a cleaning cycle.

FIGS. 3A-3D illustrate an example of a cleaning cycle in which a cleaning pad may be washed, according to some implementations of this disclosure. As shown in FIG. 3A, cleaning fluid 220 is provided into the fluid vessel 202 (301). In some implementations, as shown in FIG. 3A, the cleaning fluid 220 is provided into the fluid vessel 202 through one or more inlet conduits (not shown) distinct from the conduit 208 through which the cleaning fluid 220 is later evacuated. For example, the cleaning fluid 220 can be provided through two inlet conduits on opposite ends of the fluid vessel 202, e.g., on opposite sides of the conduit 208. The inlet conduits can provide the cleaning fluid through corresponding inlet orifices in the fluid vessel 202 (not shown) and/or can provide the cleaning fluid into the fluid vessel from above. In some implementations, the cleaning fluid 220 is provided into the fluid vessel 202 through the conduit 208. Use of distinct conduits for cleaning fluid introduction and evacuation may aid removal of debris from the fluid vessel 202 by causing newly-introduced cleaning fluid to wash leftover, settled debris towards the conduit 208.

For example, in some implementations, the control system 104 causes one or more pumps, blowers, and/or valves of the flow control system 112 to operate to drive and/or direct the cleaning fluid 220 from the cleaning fluid tank 108 through the one or more inlet conduits. In some implementations, the control system 104 causes a predetermined amount of cleaning fluid 220 to flow into the fluid vessel 202, e.g., by controlling a duration of flow from the cleaning fluid tank 108 into the fluid vessel 202. In some implementations, the cleaning fluid 220 is provided into the fluid vessel so that a portion 310 (e.g., between 15% and 50%) of a diameter or other height of the roller 200 is submerged by the cleaning fluid 220.

Figure 3B:
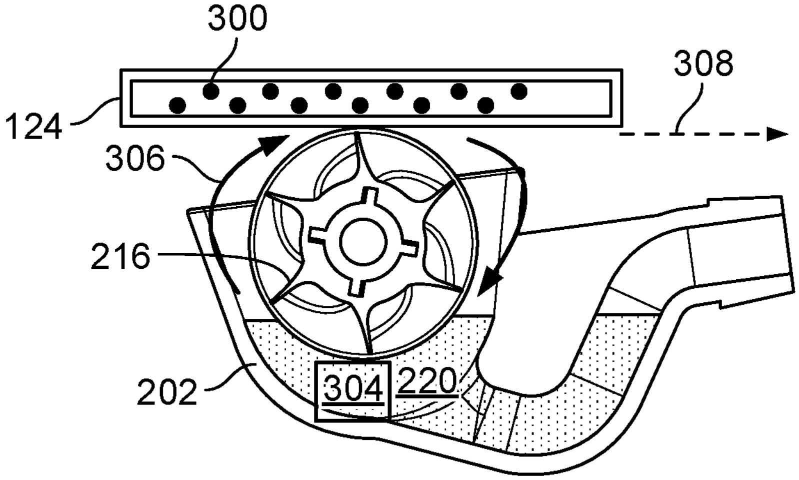
Figure 3C:
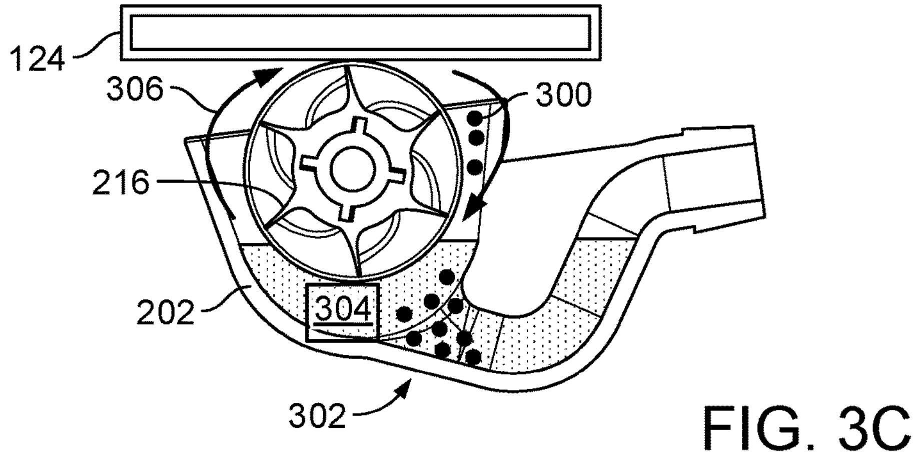

As shown in FIG. 3B, with the cleaning fluid 220 in the fluid vessel 202, the roller 200 is rotated (306), drawing cleaning fluid 220 from the fluid vessel 202 to a cleaning pad 124 and forcing the cleaning fluid 220 through the cleaning pad 124 while agitating the cleaning pad 124. For example, the control system 104 can provide a signal to the motor 132 to cause the motor 132 to rotate the roller 200 in a particular direction (in this example, clockwise). As shown in FIG. 3C, the flow of the cleaning fluid 220 causes debris 300 trapped in the cleaning pad 124 to be released and carried (e.g., carried by the cleaning fluid 220) or dropped in the fluid vessel 202., Released debris 300 accumulates at a bottom portion 302 of the fluid vessel 202. Cleaning fluid 220 that has passed through the cleaning pad 124 also returns to the fluid vessel 202 (e.g., aided by rotation of the roller 200), to be again transported to the cleaning pad 124 or evacuated from the fluid vessel 202.

One or a combination of contributing factors can cause the release of the debris 300 from the cleaning pad 124. First, the cleaning fluid 220, forced through the cleaning pad 124 by movement of the roller 200 (and, in some implementations, translation of the cleaning pad 124 and/or the roller 200 with respect to one another), hydraulically forces the debris 300 from the cleaning pad 124. This hydraulic force (e.g., in combination with physical agitation) is effective for debris removal, in some cases resulting in improved debris removal. In some implementations, hydraulic cleaning action is more effective for debris removal than other cleaning types, such as pad wetting followed by pad scraping (e.g., pad squeegeeing). For example, the hydraulic cleaning force is significantly lateral (e.g., in direction 308 indicated in FIG. 3B, parallel to a surface of the cleaning pad 124), which can dislodge debris 300 instead of causing the debris 300 to be more firmly trapped in the cleaning pad 124, as may occur with pad scraping.

Besides the benefit of hydraulic cleaning action, in some implementations, the cleaning fluid 220 is wicked into/wets fibers of the cleaning pad 124, enhancing cleaning of the cleaning pad 124. The fibers can be cloth/fabric fibers and/or synthetic fibers, in various implementations, such as fibers attached to a body of the cleaning pad 124. In addition, in some implementations, while the cleaning fluid 220 is being forced through the cleaning pad 124 (e.g., through fibers of the cleaning pad 124), the cleaning pad 124 (e.g., fibers of the cleaning pad 124) are agitated by the roller 200. For example, the roller 200 can be in contact with the cleaning pad 124, so that relative movement of the cleaning pad 124 and the roller 200 (e.g., rotation of the roller 200 and/or relative translation of the cleaning pad 124 and the roller 200) agitates the cleaning pad 124. In some implementations, the agitation is strengthened by surface features of the roller 200 (e.g., fletches 216) that impinge on the cleaning pad 124, as described in reference to FIGS. 4A-4C. Agitation further causes the release of debris 300 from the cleaning pad 124. The hydraulic transmission of cleaning fluid, the physical agitation of fibers of the cleaning pad 124, and the wetting of the fibers work together in concert to provide effective and efficient pad washing.

In some implementations, during cleaning, the cleaning pad 124 and the roller 200 are translated with respect to one another, so that the roller 200 traverses a length (e.g., an entire length) of the cleaning pad 124 to clean an entire bottom surface of the cleaning pad 124. As discussed in further detail in reference to FIGS. 6A-8B, the relative translation can be caused by one or more of (i) movement of the robot with respect to the cleaning station, (ii) movement of the roller 200 with respect to the robot, or (iii) movement of the cleaning pad 124 with respect to the cleaning station. In some implementations, a rotation direction of the roller 200 is controlled so that the portion of the roller 200 proximate the cleaning pad 124 (e.g., in contact with the cleaning pad 124) moves in a direction opposite a direction of relative translation between the roller 200 and the cleaning pad 124. The rotation direction can change as the translation direction changes. This relative direction of rotation can increase an effective hydraulic force of the cleaning fluid 220 in the cleaning pad 124 and/or can increase agitation of the cleaning pad 124.

As rotation of the roller 200 and release of the debris 300 continues, in some implementations, an efficacy of the cleaning decreases, because the cleaning fluid 220 begins to become saturated with debris, such as debris that remains suspended in the cleaning fluid 220 instead of settling at the bottom portion 302 of the fluid vessel 202. Accordingly, after performance of an amount of cleaning, cleaning can be halted and the cleaning fluid 220 and debris 300 therein can be evacuated from the fluid vessel 202. In some implementations, the control system 104 determines to halt cleaning (e.g., stop rotation of the roller 200, stop relative translation of the roller 200 and the cleaning pad 124, and/or evacuate the cleaning fluid 220 from the fluid vessel 202) based on one or more of: a number of passes that the roller 200 has made with respect to the cleaning pad 124 (e.g., cleaning can be stopped in response to the roller 200 having translated the length of the cleaning pad 124 a threshold number of times); a number of rotations performed by the roller 200 (e.g., cleaning can be stopped in response to the roller 200 having performed a threshold number of rotations); a time duration during which cleaning has been performed (e.g., cleaning can be stopped in response to cleaning having been performed for a threshold duration of time); or sensor data indicative of a contamination level of the cleaning fluid 220 in the fluid vessel 202. For example, one or more sensors 304 can be disposed in the fluid vessel 202 (e.g., arranged to be at least partially submerged by the cleaning fluid 220 when pad washing is performed). The sensors 304 can include one or more types of sensor, such as a turbidity sensor that optically measures light scattering by the cleaning fluid 220 to determine a level of contamination by debris 300 in the cleaning fluid 220. The sensors 304 can be communicatively coupled to the control system 104, e.g., wirelessly or by a wired coupling. Cleaning can be stopped in response to the contamination level exceeding a threshold contamination level, such as a sensed turbidity exceeding a threshold turbidity level.

Figure 3D:
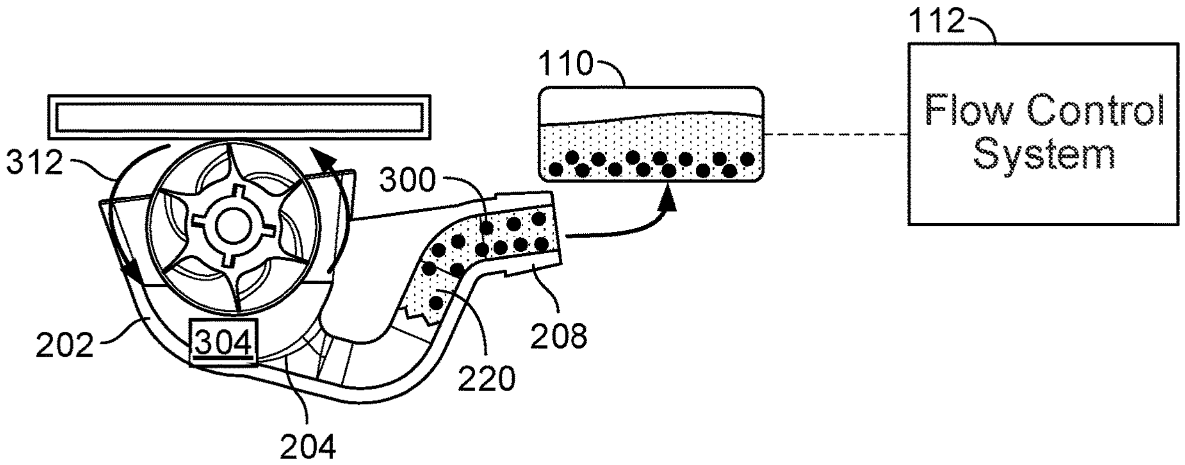

As shown in FIG. 3D, one or more pumps, blowers, and/or valves of the flow control system 112 are operated (e.g., by the control system 104) to cause the cleaning fluid 220 and released debris 300 to be evacuated from the fluid vessel 202 through the conduit 208 to the waste tank 110. For example, the pumps and/or blowers can apply a negative pressure with respect to the fluid vessel 202, causing the cleaning fluid 220 to be pulled through the conduit 208 into the waste tank 110. In some implementations, rapid movement of the cleaning fluid 220 is advantageous, because rapid transfer reduces the amount of debris 300 that is left in the fluid vessel 202 (not evacuated along with the cleaning fluid 220). For example, in some implementations a maximum fluid velocity of the cleaning fluid 220 in the conduit 208 during evacuation is between 0.3 m/s and 8.0 m/s, such as between 0.5 m/s and 8.0 m/s, between 0.5 m/s and 4.0 m/s, or between 1.0 m/s and 4.0 m/s. In some implementations, to provide for high fluid velocities, the vacuum pressure to cause evacuation of the cleaning fluid 220 (e.g., a vacuum pressure applied inside the waste tank 110 that causes the cleaning fluid 220 to flow from the fluid vessel 202 to the waste tank 110, or a vacuum pressure applied inside the conduit 208) is between 2 kPa and 40 kPa, such as between 5 kPa and 30 kPa or between 10 kPa and 30 kPa with respect to the fluid vessel 202.

In some implementations, the arrangement of the orifice 204 at the bottom portion of the fluid vessel 202 can aid in evacuating more or all of the cleaning fluid 220 and debris 300, because this arrangement results in the orifice 204 being at least partially submerged through the cleaning process and through nearly all of the evacuation process. This allows for efficient transfer of pressure-driven forces to the cleaning fluid 220 to drive the cleaning fluid 220 through the orifice 204.

In some implementations, as illustrated in FIG. 3D, during evacuation of the cleaning fluid 220, the roller 200 is caused to rotate in a direction 312 that causes the cleaning fluid 220 and debris settled in the fluid vessel 202 to be moved towards the orifice 204 by movement of the roller 200 to aid in extraction of the cleaning fluid 220 and the settled debris.

A cleaning cycle, as illustrated in FIGS. 3A-3D, begins with fresh cleaning fluid being directed into the fluid vessel, includes the cleaning fluid being directed to the cleaning pad by a rotating roller to remove debris from the cleaning pad, and ends with used cleaning fluid and the debris being evacuated from the fluid vessel, e.g., into a waste tank. The cleaning cycle can be performed once or can be performed multiple times. For example, following cleaning fluid evacuation as shown in FIG. 3D, further cleaning fluid can be provided into the fluid vessel 202 as shown in FIG. 3A, for additional pad washing. A number of the cleaning cycles, or a decision to not perform additional cleaning cycles, can be determined by the robot, by the control system 104, or by a user device in communication with the control system 104. In some implementations, cleaning cycle(s) are performed until a threshold number of cleaning cycle(s) have been performed. In some implementations, cleaning cycle(s) are performed until a threshold total volume of cleaning fluid has been transferred into the fluid vessel and/or until the roller has operated for a threshold duration of pad-washing time over the cleaning cycle(s). In some implementations, cleaning cycle(s) are performed until the sensors 304 indicate that contamination of the cleaning fluid is no longer increasing or is increasing at a rate below a threshold rate during cleaning, suggesting that little or no further debris is being removed from the cleaning pad. For example, in a cleaning cycle, after pad washing but before cleaning fluid evacuation, or before performance of another cleaning cycle, the contamination level can be detected by the sensors 304; in response to the contamination level being below a threshold contamination level, it can be determined not to perform further cleaning cycles.

In some implementations, the threshold number of cleaning cycles, the threshold volume of cleaning fluid, and/or the threshold cleaning duration can be determined based on one or more of: a duration of cleaning (e.g., cleaning using the cleaning pad) performed by the robot on a latest cleaning mission or since the latest pad washing; a floor area cleaned by the robot (e.g., cleaned using the cleaning pad) on the latest mission or since the latest pad washing; a type of cleaning(s) performed by the robot (e.g., whether a floor surface cleaned using the cleaning pad was vacuumed prior to being cleaned using the cleaning pad) on the latest cleaning mission or since the latest pad washing; a time duration (e.g., number of days) that a floor area cleaned by the robot on the latest cleaning mission was not cleaned by the robot, prior to the latest cleaning mission; a detected soil level for a floor area cleaned by the robot (e.g., presence or lack of stains and/or spills) on the latest cleaning mission or since the latest pad washing; type(s) of rooms cleaned by the robot cleaned by the robot on the latest cleaning mission or since the latest pad washing (e.g., some room types, such as bathroom or mudroom, can cause more pad-washing to be performed compared to other room types, such as living room); a current season (e.g., more mud may be expected during a first season compared to a second season); or current weather or weather since the latest pad washing (e.g., rain or snow can cause more pad-washing to be performed).

In some implementations, the threshold number of cleaning cycles, the threshold volume of cleaning fluid, and/or the threshold cleaning duration can be determined based on user input, e.g., a selection performed in an application on a user device.

Figure 4A:
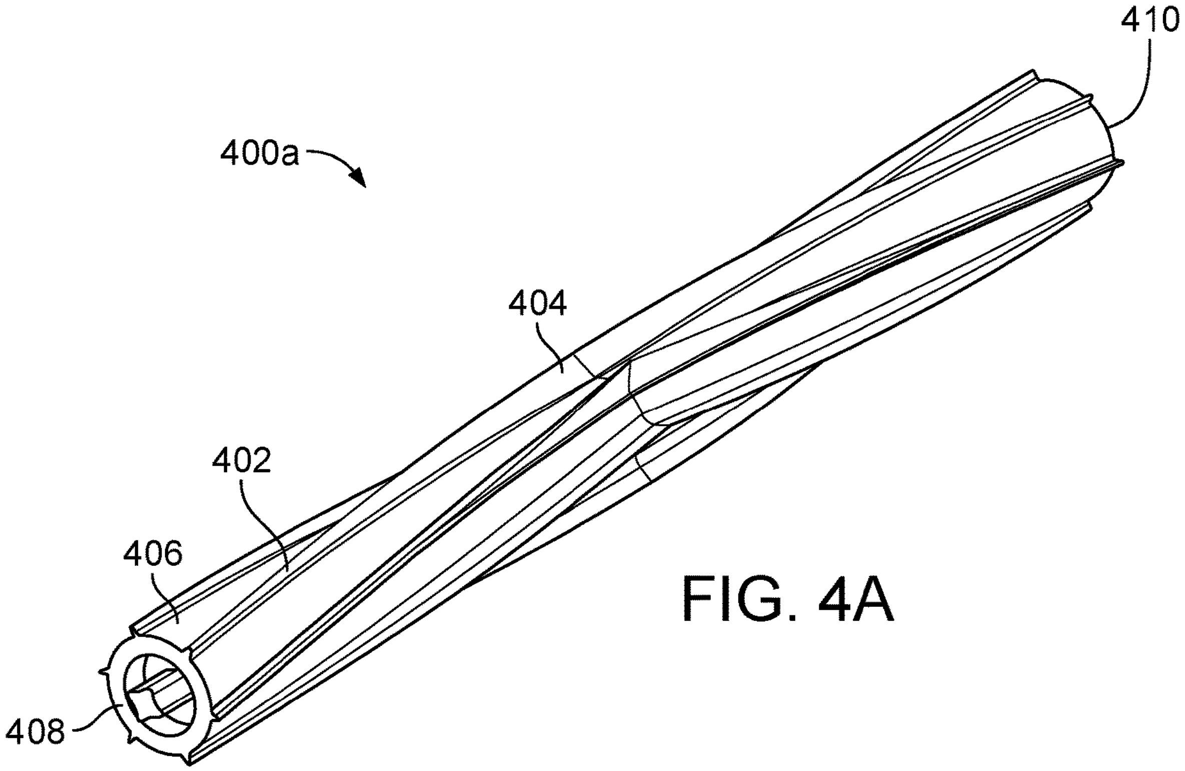
FIGS. 4A-4C are perspective views of examples of rollers.
Figure 4B:
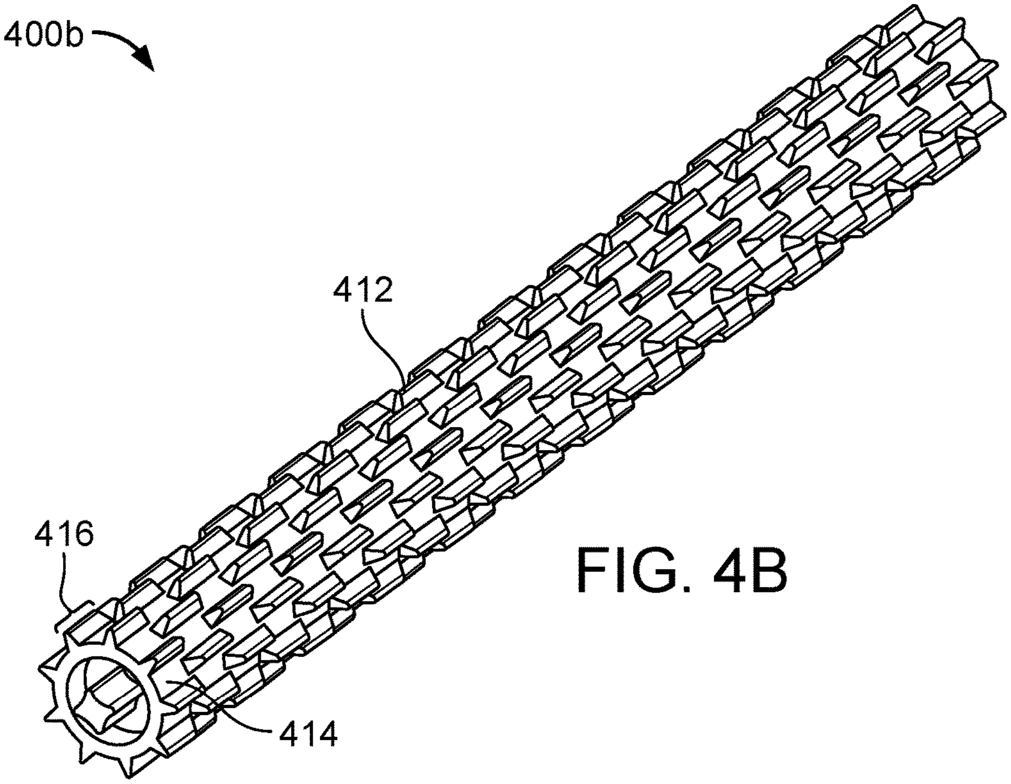
Figure 4C:
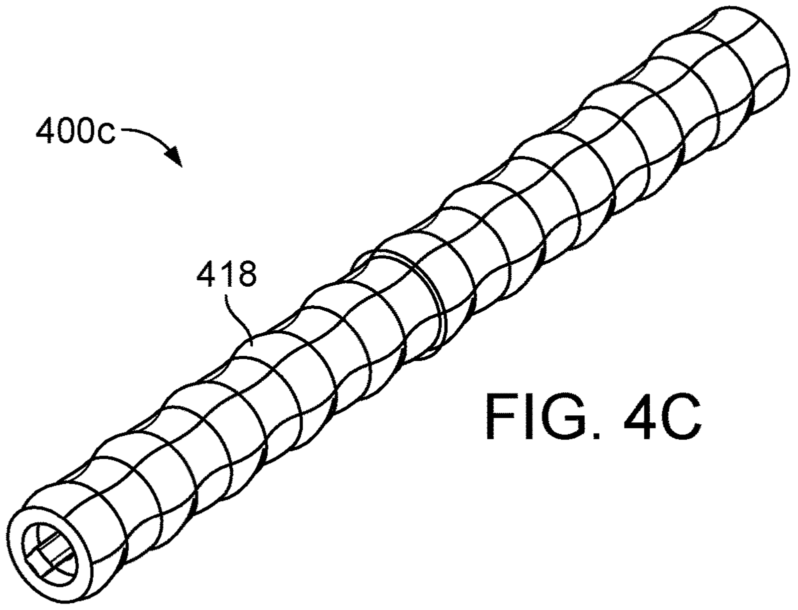

As shown in FIGS. 4A-4C, in some implementations, rollers include one or more types of surface features that can aid in transportation of cleaning fluid from the fluid vessel to the cleaning pad, hydraulic transportation of cleaning fluid through fibers of the cleaning pad, and/or agitation of the cleaning pad, to improve debris extraction. For example, as shown in FIG. 4A, a roller 400*a* includes fletches 402. The fletches 402 protrude from a surrounding surface 406 of the roller 400*a* and extend substantially axially (lengthwise) across the roller 400*a*, e.g., along more than half of or an entirety of a length of the roller 400*a*. In some implementations, the fletches 402 extend partially circumferentially as the fletches 402 extend axially across the roller 400*a*, e.g., the fletches 402 can partially wrap around the circumference of the roller 400*a*. In some implementations, the circumferential extension of the fletches 402 is two-directional. For example, from a proximal end 408 of the roller 400*a*, the fletches 402 extend counter-clockwise around the circumference of the roller 400*a* until a center 404 of the roller 400*a*, after which the fletches extend clockwise to a distal end 410 (forming an overall substantially chevron shape). Other fletch shapes are within the scope of this disclosure, e.g., one or more helical fletches extending around and down a length of the roller in a single clockwise or counter-clockwise circumferential direction. In some implementations, fletches can aid movement of cleaning fluid to the cleaning pad during rotation of the roller, acting as paddles/blades to lift the cleaning fluid. In some implementations, fletches can aid debris removal by causing additional agitation of the cleaning pad.

In some implementations, as shown in FIG. 4B, a roller 400*b* includes nubs 412 that protrude from a surrounding surface 414 of the roller 400*b*. The nubs 412 extend only partially along a length of the roller 400*b*. For example, in some implementations each nub 412 has a length 416 that is less than 3 cm, less than 2 cm, less than 1 cm, or less than 5 mm. The nubs 412 can be straight and/or curved and can be arranged in various patterns, such as regular arrays. The nubs 412 can aid cleaning fluid movement and/or cleaning pad agitation, as discussed above for fletches.

In some implementations, as shown in FIG. 4C, a roller 400*c* can include lobes 418. The lobes 418 are smooth, continuous bulges and/or depressions that distort the surface of the roller 400*c* away from the surface's overall cylindrical shape. The lobes 418 can be arranged in various patterns, such as regular arrays.

Rollers according to this disclosure can include one or more types of surface feature, such as fletches, nubs, lobes, and/or another type of surface feature, in any suitable combination to aid in cleaning fluid movement and/or pad agitation.

Figure 5:
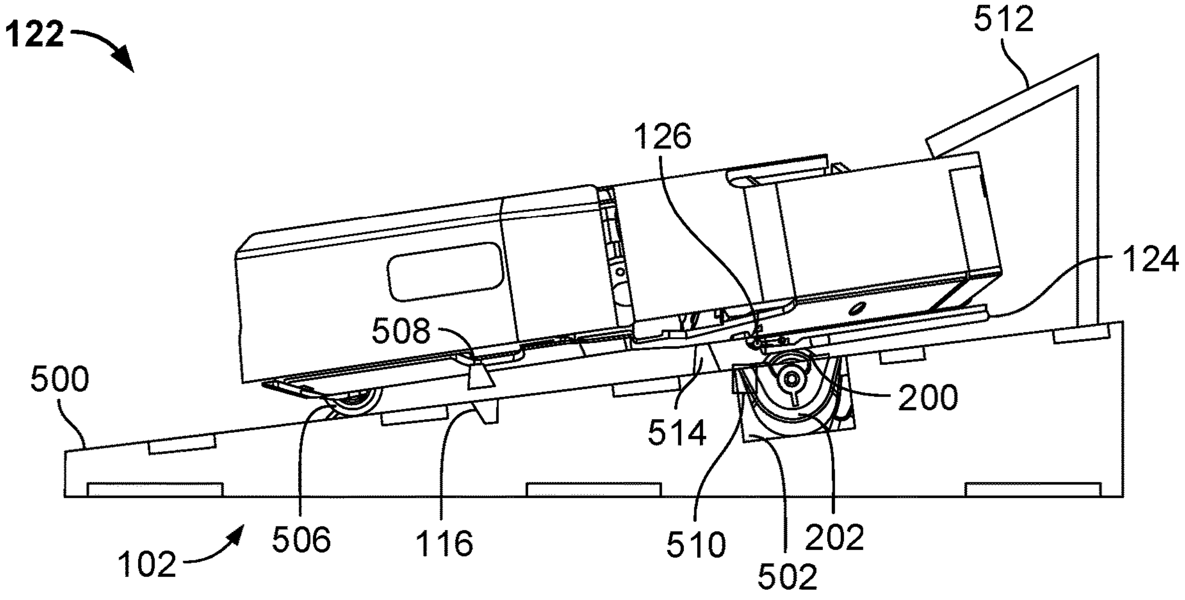
FIG. 5 is a diagram illustrating an example of a mobile cleaning robot docking on a cleaning station.

FIG. 5 illustrates an example of a cleaning robot 122 docked at a cleaning station 102. For example, a drive system of the cleaning robot 122 (including, e.g., one or more wheels 506) can operate to maneuver the robot 122 onto a surface 500 of the cleaning station 102. The surface 500 can be sloped with respect to a ground surface or parallel to the ground surface, in various implementations, and can be referred to as a "docking surface" because the robot 122 docks with the cleaning station 102 on the surface 500. In some implementations, the surface 500 has surface topology, such as transverse ribs to frictionally engage with wheels 506 of the robot 122. The robot 122 maneuvers to a position at which a cleaning pad 124, mounted on the pad holder 126 of the robot 122, comes into contact with the roller 200 of the cleaning station. Conversely, the roller 200 is arranged so that, when the robot 122 docks with the cleaning station 102 on the surface 500, the roller 200 comes into contact with the cleaning pad 124. For example, in some implementations, as shown in FIG. the fluid vessel 202 and the roller 200 are arranged in a recess 502 in the surface 500, so that the robot 122 docks above the recess 502 and the cleaning pad 124 contacts the roller 200.

In some implementations, the robot 122 and/or the cleaning station 102 have features that cause the cleaning pad 124 and the roller 200 to be pressed against one another. For example, in some implementations, the force loading of the robot 122 itself (the weight of the robot 122) creates a force between the cleaning pad 124 and the roller 200. In some implementations, the cleaning station 102 includes a squeezing feature 512, such as a flexible tab, that engages with the robot 122 or the cleaning pad 124 and pushes the cleaning pad 124 towards the roller 200. In some implementations, the cleaning station 102 includes a datum 514 that halts movement of the robot 122 or the cleaning pad 124 at a predetermined spacing from the surface 500, so that a set force is obtained between the cleaning pad 124 and the roller 200. In some implementations, the fluid vessel 202 and/or the roller 200 is attached to the rest of the cleaning station 102 by a spring-loaded mounting 510, such as a spring-loaded mounting that holds the shaft 210 of the roller 200 or another portion of the fluid vessel assembly, so that a spring force of the spring-loaded mounting 510 biases the roller 200 against the cleaning pad 124. In some implementations, the force between the cleaning pad 124 and the roller 200 can increase debris removal by increasing a degree of agitation of the cleaning pad 124 by the roller 200.

In some implementations, the cleaning station 102 can receive dry debris from the robot 122, distinct from debris trapped in the cleaning pad 124. For example, as shown in FIG. 5, the cleaning station 102 includes an intake port 116 arranged to interface with an exhaust port 508 of the robot 122. The exhaust port 508 is coupled to a debris bin in the robot 122 (not shown), which stores dry debris, such as debris vacuumed by the robot 122. One or more pumps, blowers, and/or valves of the flow control system 112 can operate to apply a vacuum that draws the debris from the debris bin, through the exhaust port 508 and the intake port 116, and to a waste tank or dry debris canister of the cleaning station 102.

Figure 6A:
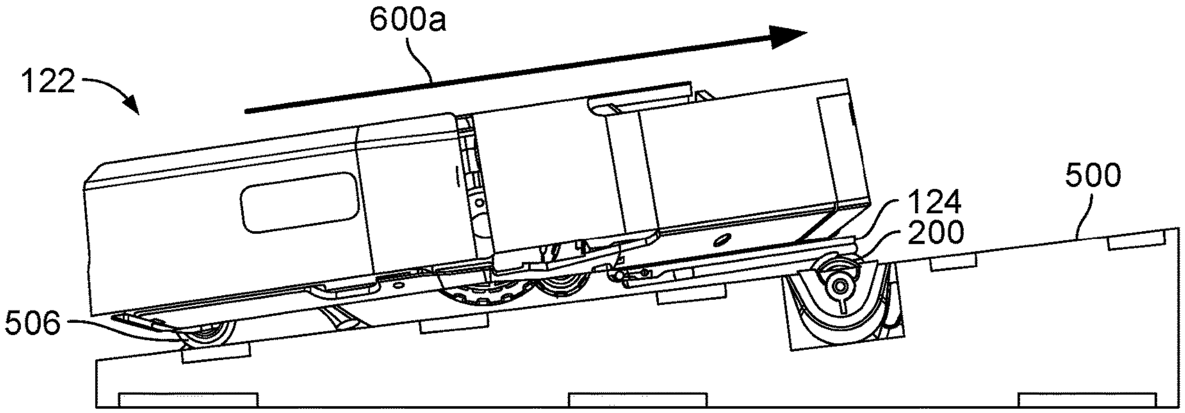
FIGS. 6A-6B are diagrams illustrating an example of a cleaning robot translating with respect to a cleaning station.
Figure 6B:
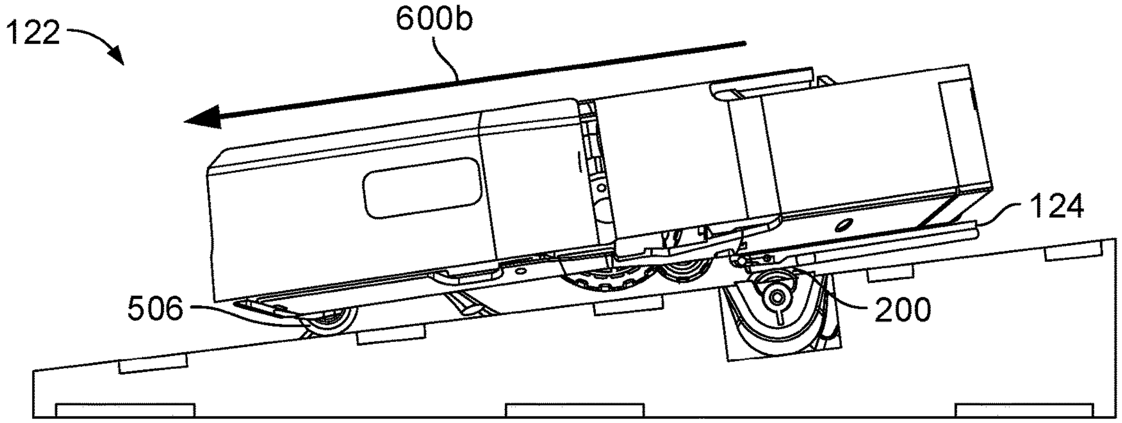

As shown in FIGS. 6A-6B, in some examples of relative translation of the cleaning pad 124 and the roller 200, the robot 122 navigates with respect to the roller 200. For example, a drive system of the robot 122, such as wheels 506 of the robot 122, can operate to move the robot 122 on the surface 500 while the cleaning pad 124 is in contact with the roller 200 and while the roller 200 is rotating. The translation can be performed in multiple directions: as shown in FIG. 6A, the robot 122 navigates in direction 600*a*, and subsequently, as shown in FIG. 6B, the robot 122 navigates in direction 600*b*. In some implementations, relative translation between the cleaning pad 124 and the roller 200 can include a rotational component. For example, rotation can be performed about a virtual axis lying within the robot, e.g., by causing wheel(s) on one side (e.g., left side) of the robot 122 to rotate forward and causing wheel(s) on an opposite side (e.g., right side) of the robot 122 to rotate backward, resulting in overall rotation of the robot 122 and cleaning pad 124 with respect to the roller 200. In some implementations, the direction of rotation of the roller 200 corresponds to the translation direction of the robot 122 so that the portion of the roller 200 proximate the cleaning pad 124 moves in a direction opposite the direction of movement of the robot 122. For example, in the configuration of FIG. 6A, the roller 200 can rotate counter-clockwise, and, in the configuration of FIG. 6B, the roller 200 can rotate clockwise. In some implementations, during pad washing, the robot 122 transmits a signal to the control system 104, the signal indicating a current or planned movement direction of the robot 122 with respect to the cleaning station 102. In response, the control system 104 can cause the roller 200 to rotate in an appropriate direction opposite the direction of translation. In some implementations, to allow the roller 200 to clean an entire length of the cleaning pad 124, the surface 500 has a length that permits movement of the robot 122 through an extent (e.g., length) of the cleaning pad 124, while the roller 200 is in contact with the cleaning pad 124.

Figure 7A:
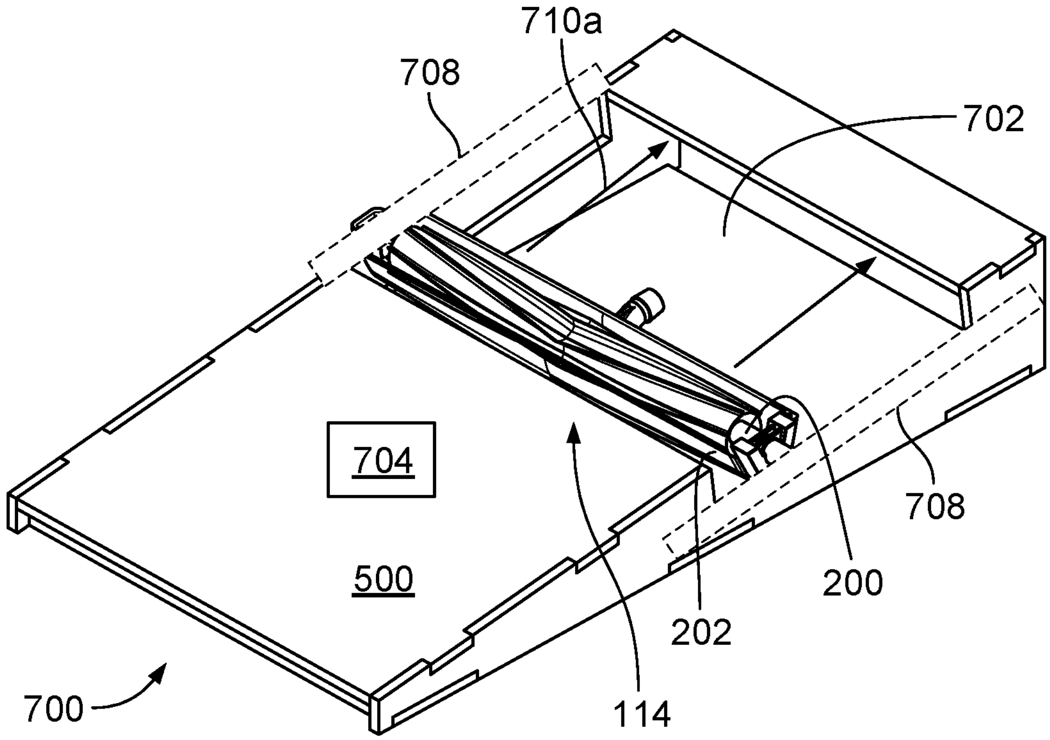
FIGS. 7A-7B are diagrams illustrating an example of a fluid vessel assembly translating with respect to a cleaning pad.
Figure 7B:
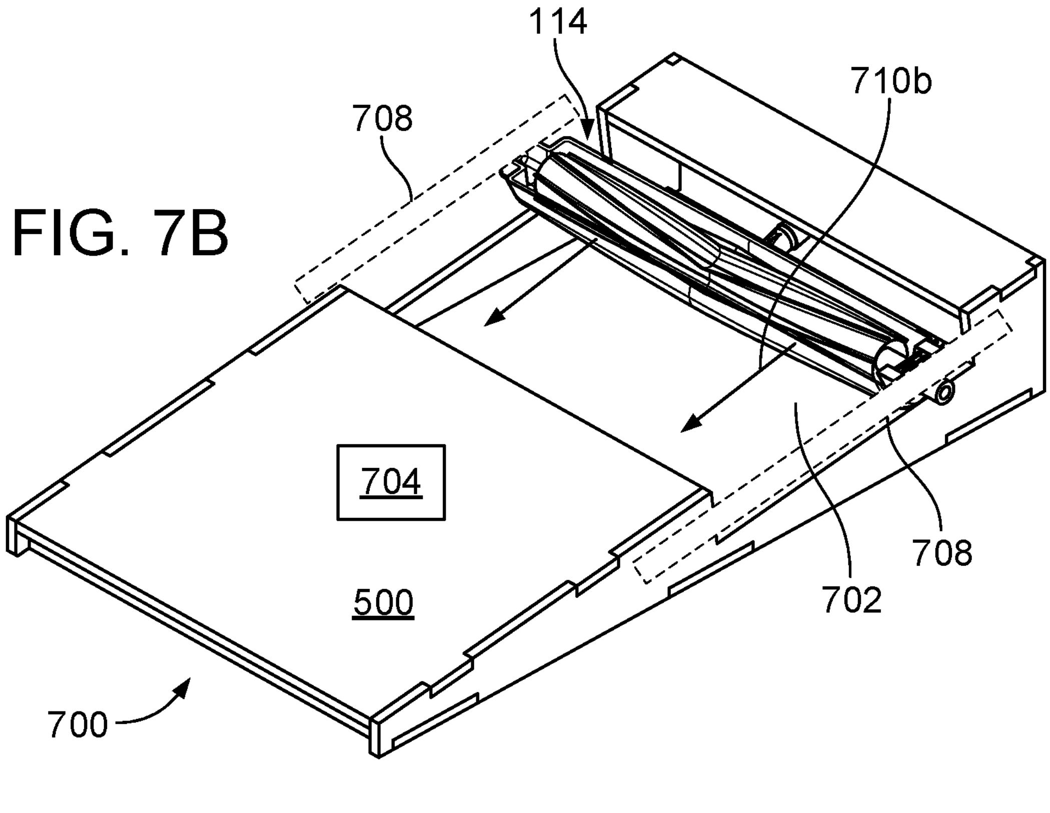

As shown in FIGS. 7A-7B, in some examples of relative translation between the roller 200 and the cleaning pad (not shown), the fluid vessel assembly 114, or a portion thereof, translates with respect to other portions of the cleaning station. For example, the fluid vessel assembly 114 or a portion thereof can be attached to a translation mechanism 708 that is operable to translate the fluid vessel assembly 114 or the portion thereof with respect to the cleaning pad during washing of the cleaning pad, while the roller 200 is rotating. The translation mechanism 708 can include, for example, track(s), rail(s), actuator(s), and/or another suitable mechanism type operable to translate the fluid vessel assembly 114 or the portion thereof. The motion can include forwards/backwards translation, left/right translation, and/or clockwise/counter-clockwise translation with respect to the cleaning station. For example, the translation mechanism 708 can be attached to the fluid vessel 202 or the bearing retainer, or to another component attached to the fluid vessel 202 or the roller 200. A motor 704 of the cleaning station, such as a servo motor or other suitable motor type, can be controlled by the control system 104 to operate the translation mechanism 708 to cause the translation. The translation direction can be parallel to/opposite a direction of rotation of the roller or perpendicular to the direction of rotation.

In some implementations, the fluid vessel and the roller translate together. For example, as shown in FIGS. 7A-7B, a base 700 of the cleaning station, having a surface 500 for docking of the robot, includes an extended recess 702 that is depressed compared to the surface 500. The roller 200 and the fluid vessel 202, together making up the fluid vessel assembly 114, can translate across the recess 702 together. The roller 200 and the fluid vessel 202 can translate together while their relative positions (the roller 200 arranged within the fluid vessel 202) are maintained, so that cleaning operations (e.g., as described in reference to FIGS. 3A-3D) can continue normally during translation. The recess 702 can have a dimension (e.g., width or length), and/or the translation mechanism 708 can otherwise have a range, that permits movement of the roller 200 through an extent (e.g., length) of the cleaning pad by the translation, while the roller 200 is in contact with the cleaning pad. In some implementations, the fluid vessel 202 has an extended width that permits translation of the roller 200 with respect to the fluid vessel 202; the translation mechanism 708 can translate the roller 200 while the fluid vessel 202 remains stationary.

The translation of the fluid vessel assembly 114 or the portion thereof can be performed in multiple directions: as shown in FIG. 7A, the fluid vessel assembly 114 translates in direction 710*a*, and subsequently, as shown in FIG. 7B, the fluid vessel assembly 114 translates in direction 710*b*. In some implementations, the direction of rotation of the roller 200 is controlled by the control system 104 to corresponds to the translation direction of fluid vessel assembly 114 so that the portion of the roller 200 proximate the cleaning pad moves in a direction matching the translation direction of the fluid vessel assembly 114 (opposite the direction of relative translation between the roller 200 and the cleaning pad). For example, in the configuration of FIG. 7A, the roller 200 can rotate clockwise, and, in the configuration of FIG. 7B, the roller 200 can rotate counter-clockwise.

Figure 8A:
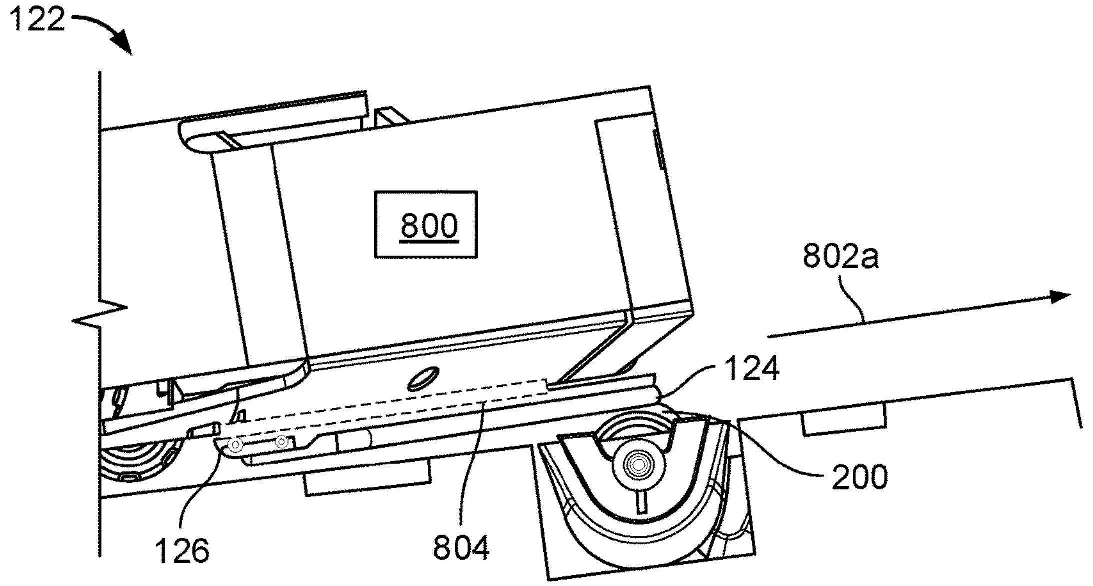
FIGS. 8A-8B are diagrams illustrating an example of a cleaning pad translating with respect to a cleaning station.
Figure 8B:
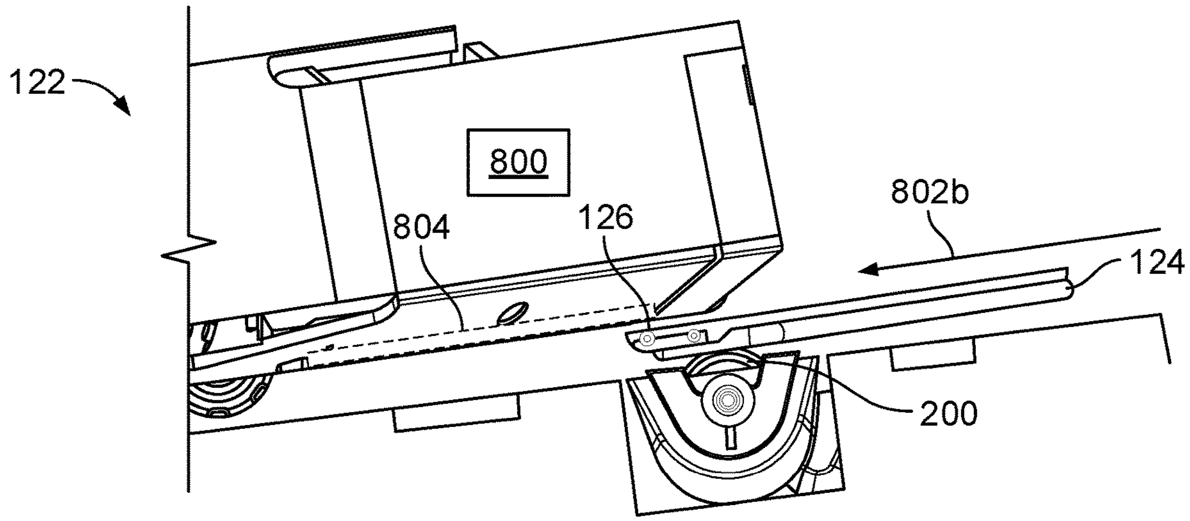

As shown in FIGS. 8A-8B, in some examples of relative translation between the roller 200 and the cleaning pad 124, the cleaning robot 122 includes a translation mechanism 804 attached to the pad holder 126. The translation mechanism 804 is operable to translate the pad holder 126 (and, with the pad holder 126, the cleaning pad 124 mounted on the pad holder 126) with respect to the rest of the robot 122. The translation mechanism 804 can include, for example, track(s), rail(s), actuator(s), and/or another suitable mechanism type operable to translate the pad holder 126. A motor 800 in the robot 122, such as a servo motor, a linear screw motor, a motor/gearbox unit, or other suitable motor type, can be controlled by a control system of the robot 122 to operate the translation mechanism 804 to cause the translation. In some implementations, the motor 800 is a dedicated motor for translation of the pad holder 126. In some implementations, the motor 800 additionally serves one or more other functions, and the control system of the robot 122 can appropriately reconfigure mechanism(s) of the robot 122 to use the motor to translate the pad holder 126. The translation mechanism 804 can have sufficient range to permit movement of the roller 200 through an extent (e.g., length) of the cleaning pad 124 by the translation, while the roller 200 is in contact with the cleaning pad 124.

In some implementations, the robot 122 receives an instruction from the cleaning station 102 and, in response to the instruction, causes the cleaning pad 124 to move with respect to the cleaning station, e.g., initiates translation of the pad holder 126 and/or the robot 122 (using the drive system).

The translation of the pad holder 126 can be performed in multiple directions: as shown in FIG. 8A, the pad holder 126 and cleaning pad 124 translate in direction 802*a*, and subsequently, as shown in FIG. 8B, the pad holder 126 and cleaning pad 124 translate in direction 802*b*. In some implementations, the direction of rotation of the roller 200 corresponds to the translation direction of the pad holder 126 so that the portion of the roller 200 proximate the cleaning pad 124 moves in a direction opposite the direction of movement of the cleaning pad 124. For example, in the configuration of FIG. 8A, the roller 200 can rotate counterclockwise, and, in the configuration of FIG. 8B, the roller 200 can rotate clockwise. In some implementations, during pad washing, the robot 122 transmits a signal to the control system 104, the signal indicating a current or planned movement direction of the pad holder 126 with respect to the cleaning station 102. In response, the control system 104 can cause the roller 200 to rotate in an appropriate direction opposite the direction of translation.

The pad holder 126, whether or not it is translatable by a translation mechanism, can include a pad plate and a suitable attachment mechanism to securely hold the cleaning pad 124 to the pad plate during pad washing. For example, the pad holder 126 can a velcro attachment area, clip(s), strap(s), hook(s), button(s), and/or another suitable attachment type.

In some implementations, multiple of the translation types described in reference to FIGS. 6A-8B can be included and can operate simultaneously, e.g., to increase a speed of the relative translation, which may further increase the hydraulic force and/or the agitation that promote debris removal. Moreover, in some implementations, roller rotation is instead performed opposite the directions described in reference to FIGS. 6A-8B, e.g., so that the portion of the roller 200 proximate the cleaning pad 124 moves in a direction matching the relative direction of movement of the cleaning pad 124.

Figure 9:
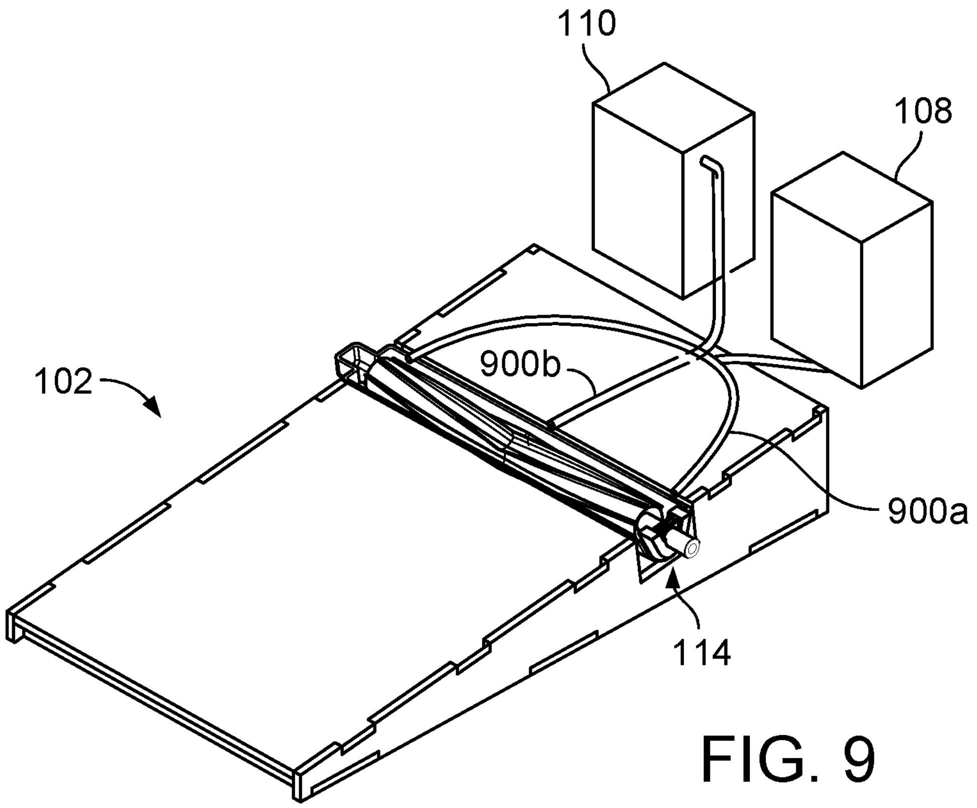
FIG. 9 is a diagram illustrating examples of vessels of a cleaning station.

As shown in FIG. 9, in some implementations, the cleaning station 102 includes a cleaning fluid tank 108 and a waste tank 110. The cleaning fluid tank 108 stores fresh cleaning fluid and can be filled by a user, e.g., can include an input port through which a user can pour cleaning fluid. The cleaning fluid can include, for example, water or a cleaning solution, e.g., including a soap. The waste tank 110 stores cleaning fluid that has been used to remove debris from a cleaning pad, along with, in some implementations, the removed debris. The waste tank 110 can be emptied by a user, e.g., can include an output port through which a user can pour out the contents of the waste tank 110. Either or both of the cleaning fluid tank 108 or the waste tank 110 can be removable from the cleaning station 102 to facilitate convenient filling, emptying, and/or manual washing of the tanks.

In the example of FIG. 9, the cleaning fluid tank 108 is fluidically coupled to the fluid vessel assembly 114 by conduits 900*a* that couple to two inlet orifices of the fluid vessel of the fluid vessel assembly 114. The waste tank 110 is fluidically coupled to the fluid vessel assembly 114 by other conduits 900*b* that couple to another orifice of the fluid vessel. The flow control system of the cleaning station 102 can operate to flow fresh cleaning fluid from the cleaning fluid tank 108 through conduits 900*a* into the fluid vessel, and can operate to evacuate used cleaning fluid, along with debris, from the fluid vessel through conduits 900*b* to the waste tank 110. Other implementations according to this disclosure can include a single orifice through which cleaning fluid is both input into the fluid vessel and evacuated from the fluid vessel. Any of the implementations according to this disclosure can include one or both configurations, e.g., orifice(s)/conduit(s) dedicated to cleaning fluid input or evacuation, and/or orifice(s)/conduit(s) used for both cleaning fluid input and evacuation. The inclusion of separate conduit(s) and/or orifice(s) for cleaning fluid inlet and evacuation can increase a cleaning effectiveness by reducing mixing between clean and used fluid.

In some implementations, cleaning station 102 includes one or more sensors to detect (i) a fill level of the cleaning fluid tank 108 and/or (ii) a fill level of the waste tank 110. In some implementations, when the fill level of the cleaning fluid tank 108 drops to zero or below a threshold, the cleaning station 102 can transmit a notification (e.g., to a user device) indicating that a user should refill the cleaning fluid tank 108. In some implementations, a pump or sensor of the flow control system 112 is configured to monitor a cumulative volume of cleaning fluid delivered to the cleaning vessel assembly; fill levels of the cleaning fluid tank 108 and/or the waste tank 110 can be determined based on the cumulative volume. In some implementations, when the fill level of the waste tank 110 is full or above a threshold, the cleaning station 102 can transmit a notification (e.g., to a user device) indicating that a user should empty the waste tank 110.

Figure 10:
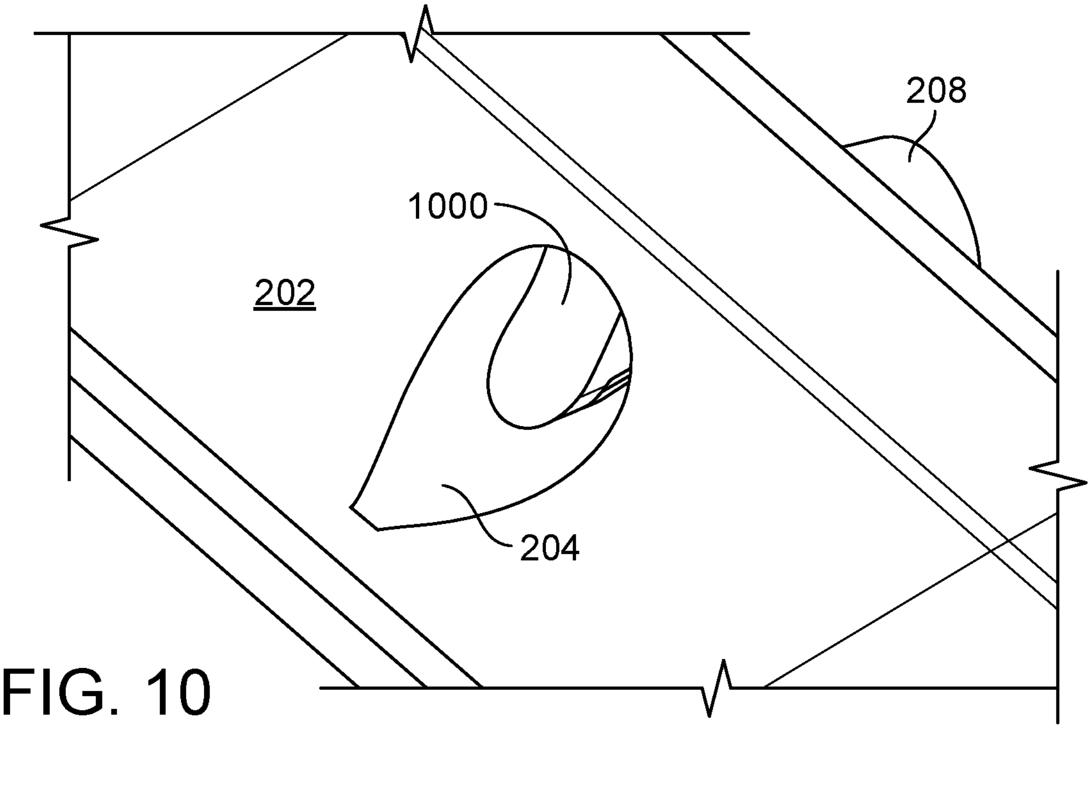
FIG. 10 is a perspective view of an example of an occlusion element.

While it may be convenient to evacuate small debris from the fluid vessel with used cleaning fluid, large debris may block conduits of the cleaning station and disrupt fluid flow. Accordingly, in some implementations, as shown in FIG. 10, an occlusion feature, such as a septum 1000, is disposed in the orifice 204 or in the conduit 208 in proximity to the fluid vessel 202. The septum 1000 is sized to prevent flow of debris above a threshold size through the conduit 208. For example, the septum 1000 can have a size that prevents objects having a diameter greater than about 1 cm from flowing through the conduit 208. In some implementations, the septum 1000 is arranged laterally in the middle of the fluid flow path. For example, the septum 1000 can be attached to a roof of the conduit 208 in the lateral middle of the conduit 208, so that cleaning fluid and debris is permitted to flow to the left, to the right, and under the septum 1000. Hair, sand, dust, and other small debris will flow by without significant obstructions, while larger debris will be blocked and remain in the fluid vessel 202 or in the orifice 204. In some implementations, instead of or in addition to a septum, another type of occlusion feature that limits a size of the debris that is evacuated from the fluid vessel 202, such as a cage filter, can be disposed in the orifice 204 or in the conduit 208. In some cases, a septum can provide an improved user experience compared to a filter, because the septum may create fewer debris blockages that require clearing by a user. Debris blocked by an occlusion feature can be removed manually by a user, the removal being convenient due to the occlusion feature's placement in close proximity to the fluid vessel 202; the user need not access internal components of the cleaning station.

In some implementations, one or more sensors are included in the fluid vessel assembly to sense whether large debris is hindering performance of the roller. For example, the one or more sensors can be included in the roller and can be configured to sense whether the roller is halting in its rotation, rotating more slowly than desired, and/or drawing more current in the roller motor than a baseline current level, any of which can be indicative of large debris that is inhibiting roller rotation. The sensing can be performed during a cleaning cycle or during a calibration test performed separately from a cleaning cycle (e.g., when the roller is not engaged with the cleaning pad), e.g., to check current draw against the baseline current level. In some implementations, the sensors include a rotary sensor, such as a rotary optical encode, to sense rotation of the roller. The sensors can be communicatively coupled to the control system 104, and, in some implementations, the control system 104 can perform one or more operations in response to detection of large debris. For example, in some implementations, the control system 104 can halt pad washing in response to detection of large debris. In some implementations, the control system 104 can cause transmission of a notification to a user device, the notification indicating that a user should clear the large debris from the fluid vessel 202.

Figure 11:
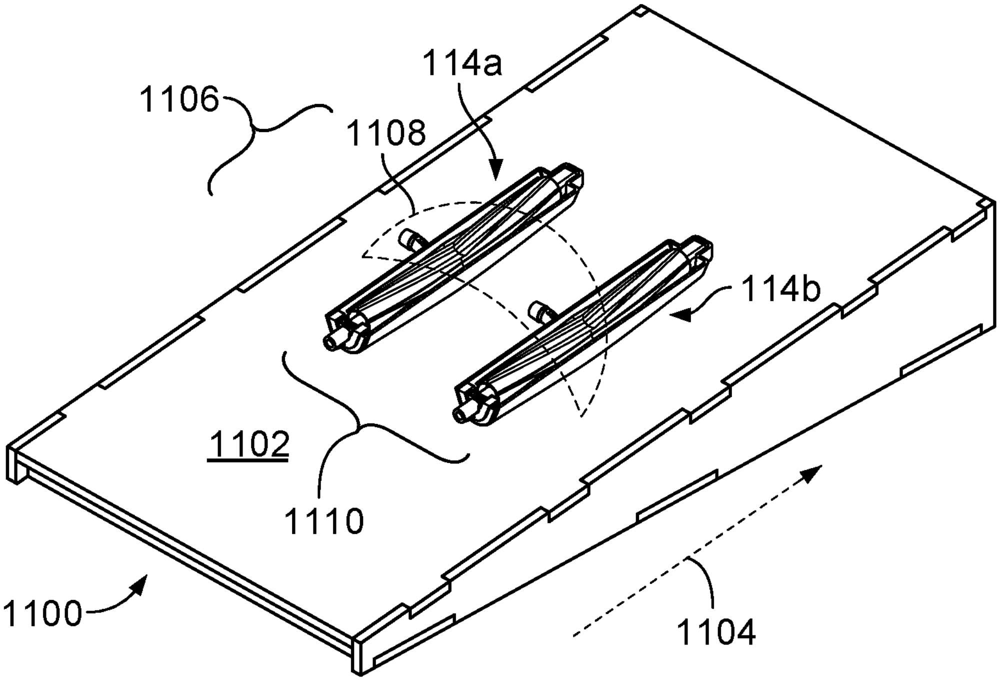
FIG. 11 is a diagram illustrating an example of a cleaning station including two fluid vessel assemblies.

Although some of the previously-discussed cleaning station implementations include only a single roller and a single fluid vessel, some implementations can include multiple rollers and multiple fluid vessels, each roller arranged in a corresponding fluid vessel. For example, as shown in FIG. 11, a cleaning station 1100 includes two fluid vessel assemblies 114*a*, 114*b*, each assembly 114*a*, 114*b* having some or all of the characteristics described for fluid vessel assembly 114. For example, each assembly 114*a*, 114*c* can include a respective roller disposed in a respective fluid vessel, can have one or more orifices coupled to one or more conduits to allow for input/extraction of cleaning fluid, and can, in some implementations, be translatable by a translation mechanism. In some implementations, the assemblies 114*a*, 114*b* are arranged parallel to one another, e.g., so that the rollers of the assemblies 114*a*, 114*b* can rotate parallel to one another. In some implementations, rollers of the assemblies are arranged in a direction as shown for assemblies 114*a*, 114*b*, extending along a direction 1104 that corresponds to a shorter dimension 1106 of a cleaning pad 1108 when the cleaning pad 1108 is arranged for washing by the assemblies 114*a*, 114*b*, as opposed to a longer dimension 1110. For example, for a given cleaning pad 1108, lengths of rollers of the assemblies 114*a*, 114*b* can be shorter than a length of a roller of the fluid vessel assembly 114 illustrated in FIG. 9. This arrangement can be useful, for example, in implementations in which the robot rotates about a virtual axis by motion created by counter-rotation of wheels of the robot, in which case an angle about which the robot rotates for full cleaning pad coverage may be decreased. The assemblies 114*a*, 114*b* can be translatable along the dimension 1110 to together wash an entire length of the cleaning pad 1108. In some implementations, multiple assemblies can be oriented along the orthogonal direction to direction 1104, e.g., to extend along the longer dimension 1110 of the cleaning pad 1108.

Figure 12:
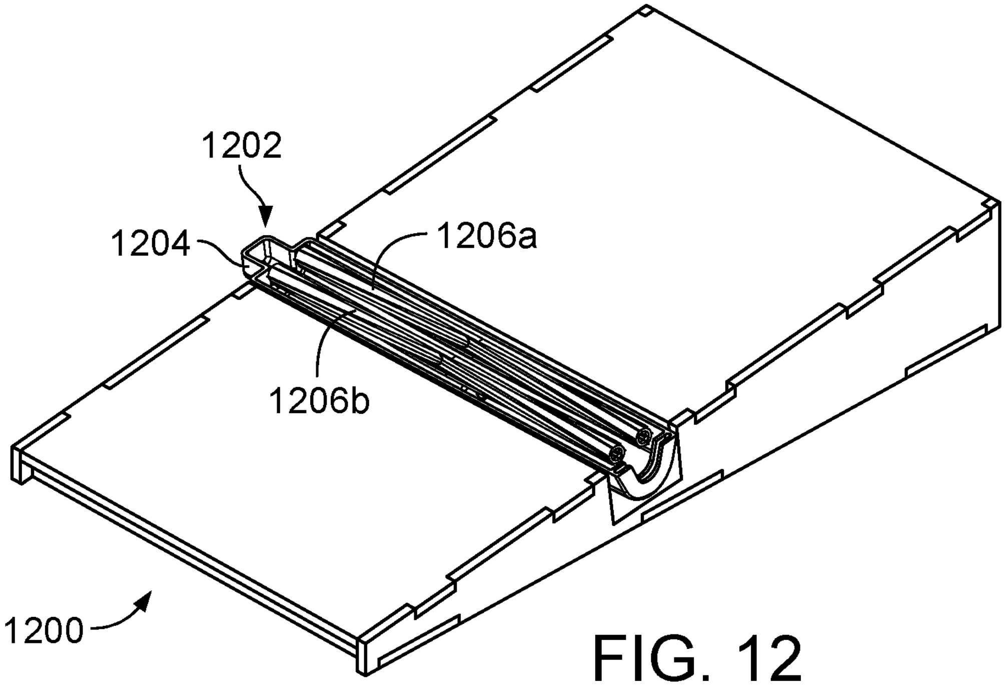
FIG. 12 is a diagram illustrating an example of a cleaning station including two rollers in a fluid vessel.

In some implementations, a cleaning station includes one or more fluid vessels, and at least one of the fluid vessels has multiple rollers arranged therein. For example, as shown in FIG. 12, a cleaning station 1200 includes a fluid vessel assembly 1202 having a fluid vessel 1204 and two rollers 1206*a*, 1206*b*. The fluid vessel 1204 can have a shape sufficient to accommodate both rollers 1206*a*, 1206*b*, e.g., can be wider than a fluid vessel that holds only a single roller. During pad washing, the rollers 1206*a*, 1206*b* can rotate simultaneously, e.g., in the same direction or in opposite directions. For example, in some implementations, a first roller (e.g., roller 1206*b*) can rotate counter-clockwise while the other roller (e.g., roller 1206*a*) rotates clockwise, so that fluid is brought up from between the two rollers by the action of both rollers. In some implementations, relative translation of the cleaning pad and the rollers 1206*a*, 1206*b* can be performed such that more than half, or all, of the cleaning pad is washed (e.g., in contact with) both rollers 1206*a*, 1206*b* over the course of pad washing. The use of two rollers can improve pad washing, e.g., can increase an amount of debris removed from a pad and/or can reduce a time that the cleaning pad must be washed to remove a given amount/proportion of debris. Although FIG. 12 illustrates the two rollers 1206*a*, 1206*b* extending horizontally (e.g., orthogonal to the direction of extension of the rollers of fluid vessel assemblies 114*a*, 114*b* in FIG. 11), in some implementations two rollers in a common fluid vessel assembly can be oriented as shown for the fluid vessel assemblies 114*a*, 114*b*.

The features described in reference to FIGS. 2A-12 can provide advantages for pad washing compared to at least some other pad washing schemes. For example, as described in reference to FIGS. 3A-3D, hydraulic pad washing in combination with pad agitation can result in improved debris removal compared to pad-scraping methods. The high-velocity extraction of contaminated fluid from the fluid vessel can result in all or nearly all debris being removed from the fluid vessel, decreasing an amount of user interaction required to maintain the cleaning system (e.g., except for emptying the waste tank when full). For example, the amount of user interaction can be decreased compared to sieve-based approaches in which a user is expected to routinely interact with a dirty portion of a device. In addition, the use of a fluid vessel and roller in combination can reduce exposure of the cleaning station to messes associated with pad washing, such as used cleaning fluid and debris. Except for conduits and other flow-related components, only the fluid vessel and roller are exposed to used cleaning fluid and debris, representing a relatively small surface area that may need manual cleaning by a user: the mess is contained in the easily-accessible and relatively small fluid vessel, which in some implementations is removable from the cleaning station. In some cases, manual cleaning (save for removal of large debris) may not be required at all. By contrast, some alternative schemes result in large surface areas that are contaminated by used cleaning fluid and debris, resulting in worse pad washing performance over time in the absence of arduous manual cleaning by a user. Moreover, because cleaning fluid is re-used over the course of each cleaning cycle (drawn to the cleaning pad, directed to the fluid vessel, and drawn to the cleaning pad again), less cleaning fluid overall may be used compared to alternative approaches, decreasing expense and user time associated with cleaning fluid refilling.

In different implementations, various different combinations and arrangements of conduits, vessels, and flow control system components can be used to intake and store waste. For example, dry debris and debris from a cleaning pad can be extracted separately or through at least a partially common path, and the dry debris and the debris from the cleaning pad can be stored separately or together in a common waste vessel. FIGS. 13-16 illustrate several examples of waste intake arrangements and components thereof.

Figure 13:
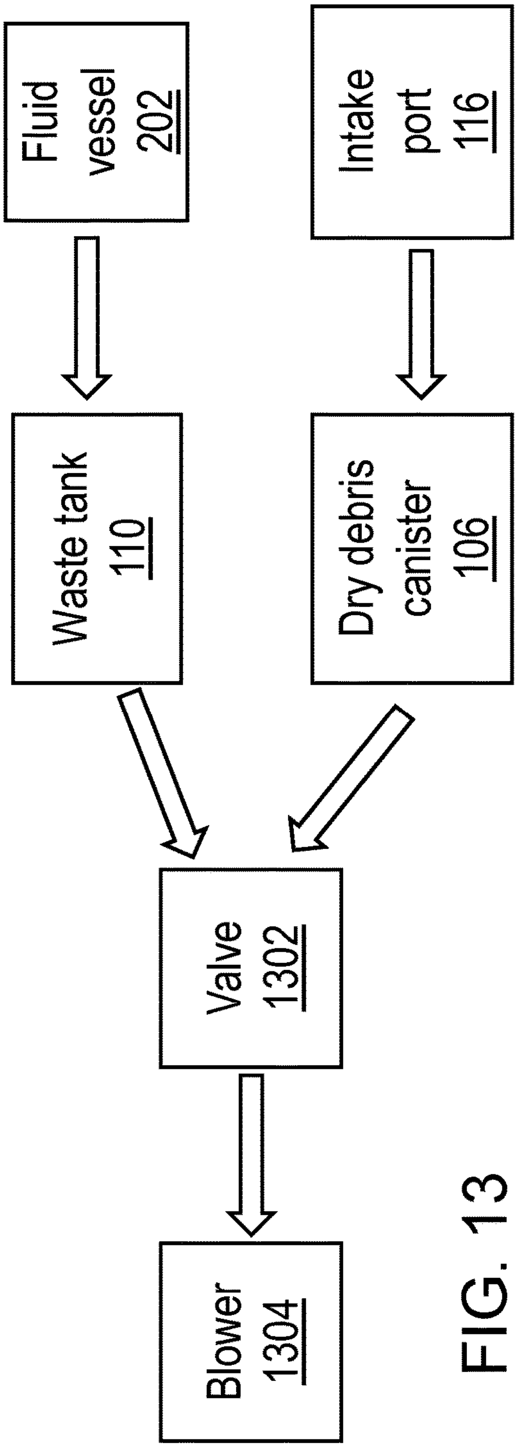
FIG. 13 is a diagram illustrating waste transfer into a waste tank and a dry debris canister.

As shown in FIG. 13, in some implementations, a waste tank 110 is arranged to receive used cleaning fluid and debris that result from pad washing, and a separate dry debris canister 106 is arranged to receive dry debris from the cleaning robot. The waste tank 110 is fluidically coupled (e.g., by conduits) to one or more fluid vessels 202, and the dry debris canister 106 is fluidically coupled to the intake port 116. In some implementations, separate pumps/blowers are used to drive transfer of cleaning fluid/debris to the separate waste tank 110 and dry debris canister 106. In some implementations, a common pump/blower drives transfer into both vessels. For example, as shown in FIG. 13, a blower 1304 can apply a vacuum to either the waste tank 110 or the dry debris canister 106 depending on a configuration of the valve 1302. In a first configuration of the valve 1302, the blower 1304 applies a vacuum that drives flow of cleaning fluid and debris from the fluid vessel 202 into the waste tank 110. In a second configuration of the valve 1302, the blower 1304 applies a vacuum that drives flow of dry debris from the intake port 116 (e.g., from an exhaust port of a cleaning robot) to the dry debris canister 106. The valve 1302 can be switched between its configurations by the control system 104. One or more elements can prevent flow of cleaning fluid/debris past the waste tank 110 or the dry debris canister 106 to the valve 1302, e.g., as described in reference to FIG. 16. In some implementations, the dry debris canister 106 includes a filter, such as a mesh filter, to retain solid debris in the dry debris canister 106 and allow air directed by the blower 1304 to pass out of the dry debris canister 106, e.g., to the valve 1302.

Figure 14:
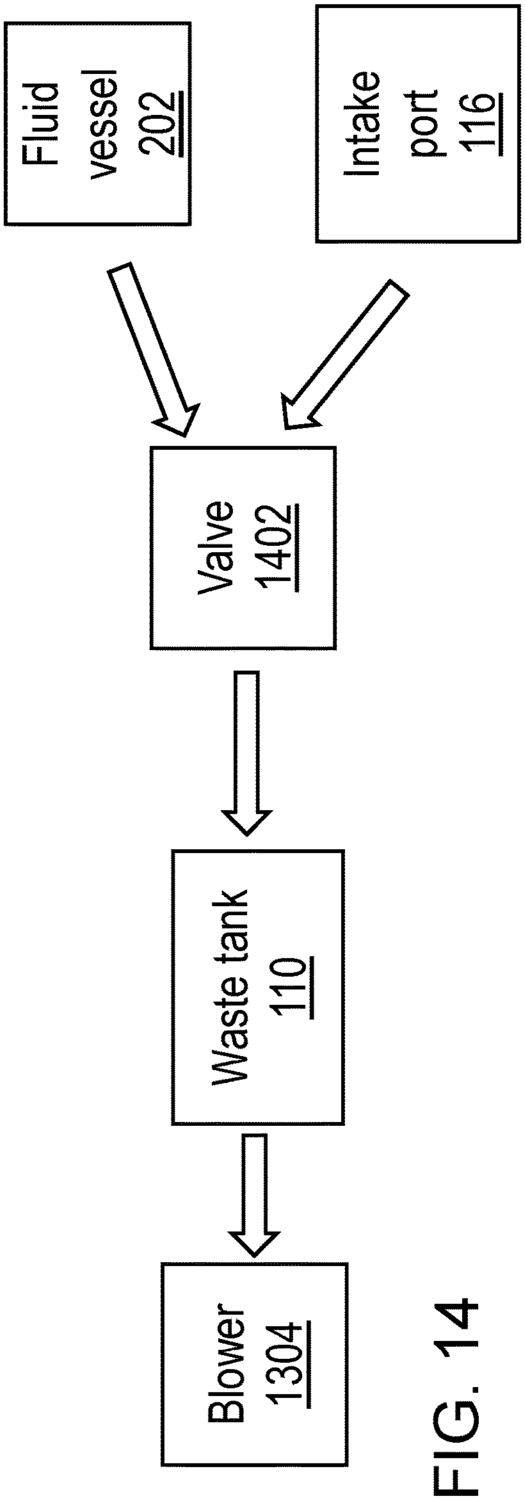
FIG. 14 is a diagram illustrating waste transfer into a common waste tank.
Figure 15:
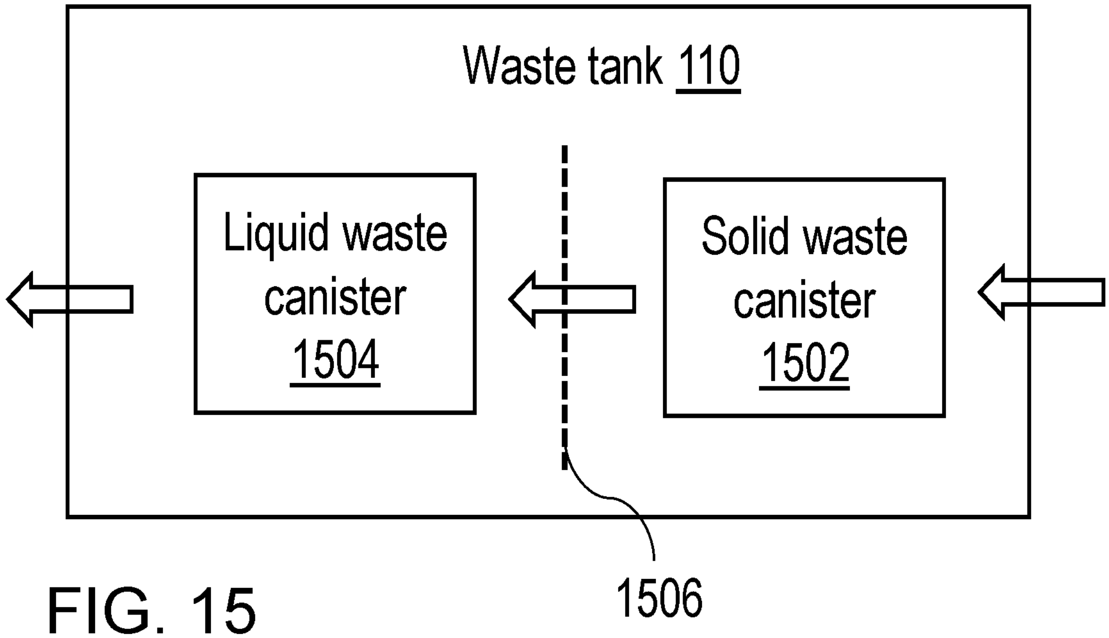
FIG. 15 is a diagram illustrating an example of solid/liquid waste separation.

In some implementations, as shown in FIG. 14, a common waste tank 110 is arranged to receive both cleaning fluid/debris from the fluid vessel 202 and dry debris from the intake port 116. For example, a valve 1402, controlled by the control system 104, can switch between coupling the fluid vessel 202 to the waste tank 110 or coupling the intake port 116 to the waste tank 110. When a pump or blower 1304 is activated, a generated vacuum draws cleaning fluid and/or debris from whichever of the fluid vessel 202 or intake port 116 is coupled to the waste tank 110, through the valve 1402, and to the waste tank 110.

Figure 16:
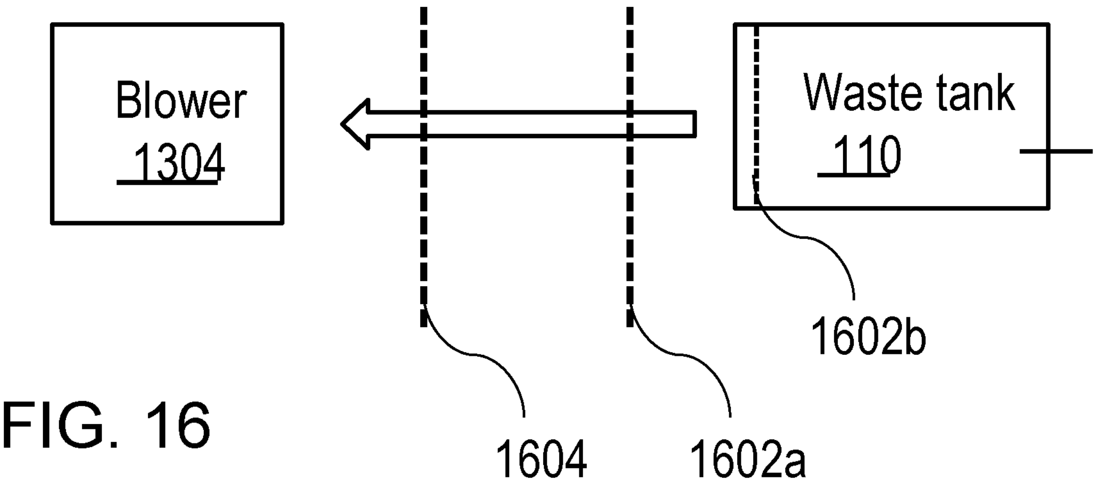
FIG. 16 is a diagram illustrating an example of air/liquid separation.

In some implementations, the waste tank 110 includes features to separate liquid waste, such as used cleaning fluid, from solid waste, such as debris removed from a cleaning pad or extracted from a debris bin of a cleaning robot. For example, as shown in FIG. 16, a waste tank 110 can include a solid waste canister 1502, a liquid waste canister 1504, and an element 1506, such as a filter, that directs or retains solid waste in the solid waste canister 1502 and directs or retains liquid waste in the liquid waste canister 1504. For example, the element 1506 can include a rinsable mesh strainer, a washable fabric filter, a disposable mesh or fabric filter, or an inertial separation device, e.g., based on cyclonic motion. In some implementations, the solid waste canister 1502 is located within the liquid waste canister 1504. For example, the solid waste canister 1502 can be separately removable from the liquid waste canister 1504 to allow for convenient emptying by a user.

In some implementations, one or more air separation elements are provided to separate liquid waste from the airstream generated by a pump or blower, so that the liquid is retained in the waste tank 110. As shown in FIG. 16, one or more air separation element 1602*a*, 1602*b* can be provided in the waste tank 110, between the waste tank 110 and the blower 1304, or both, and/or in another location. For example, the air separation element 1602*a* (e.g., a post filter) can be provided between the waste tank 110 and a valve, e.g., as in the configuration of FIG. 13. In some implementations, the air separation element 1602*b* is integrated into the waste tank 110, e.g., arranged at least partially in the waste tank 110. For example, the air separation element 1602*b* can be integrated into the liquid waste canister 1504, e.g., within the liquid waste canister 1504. The air separation element(s) 1602*a*, 1602*b* can include, for example, one or more of: a tortuous path (e.g., a tortuous path defined by conduits) that permits traversal by gas but prohibits traversal by liquid; a chamber and/or conduit shaped to cause a reduction in fluid velocity, so that cleaning fluid falls out of the air stream; an inertial separation device, e.g., based on cyclonic motion; or an air-only permeable membrane that blocks flow of liquid but allows flow of gas.

In some implementations, a drying element 1604 is included after the air separation element 1602 to remove moisture from the air stream. For example, the drying element 1604 include a foam or fabric filter, an evaporation chamber, and/or an inertial separation. Following the drying element 1604, dry air is directed out of the cleaning station into the surrounding environment.

Figure 17:
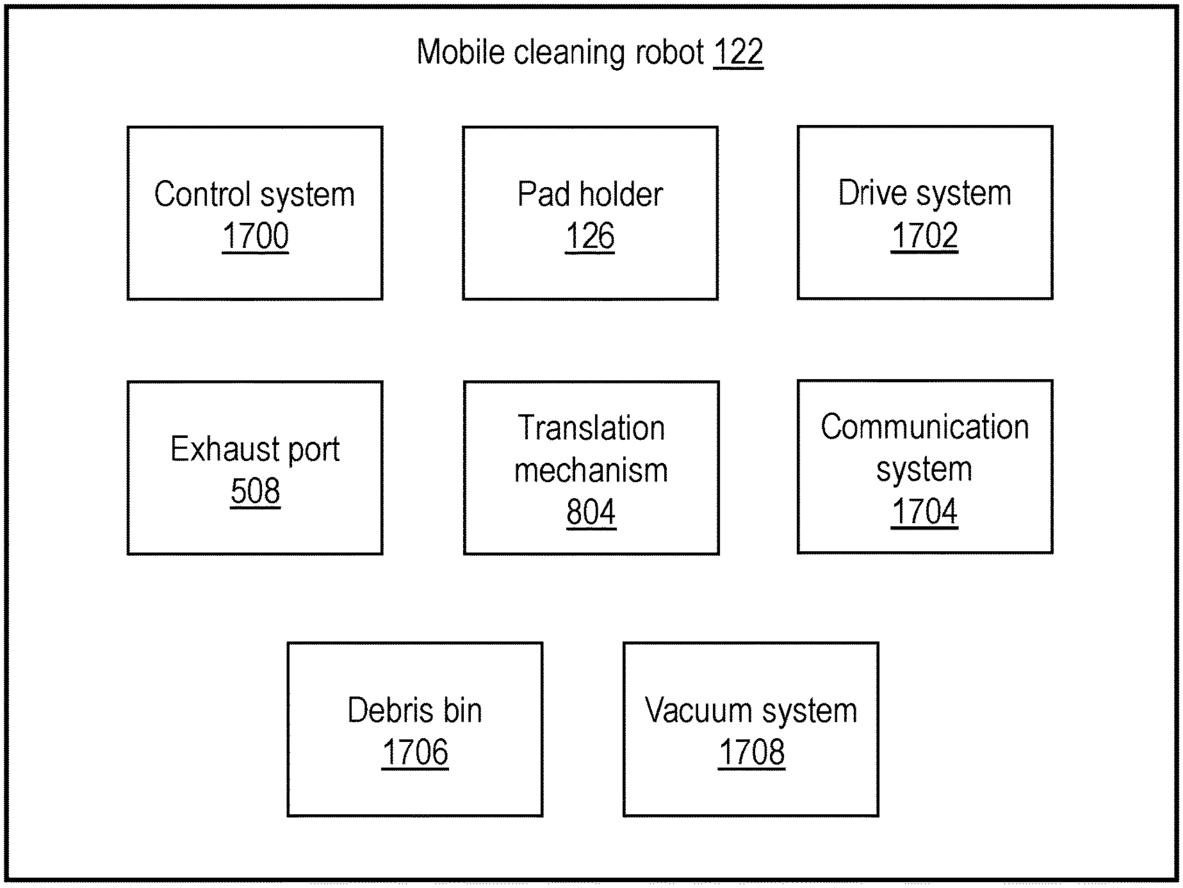
FIG. 17 is a diagram illustrating components of an example of a cleaning robot.

FIG. 17 illustrates an example of a mobile cleaning robot 122, according to some implementations of this disclosure. The mobile cleaning robot 122 includes a pad holder 126 that is sized and shaped to hold a corresponding cleaning pad. For example, in some implementations, the pad holder has a shape matching a shape of a cleaning pad. For example, the pad holder 126 can be crescent-shaped to hold the crescent-shaped cleaning pad 1108. A drive system 1702, such as a motor and one or more mobility devices, is operable to move the robot about a floor surface. For example, the mobility devices can include wheels or tracked elements. In some implementations, a vacuum system 1708 includes one or more suction elements operable to vacuum debris from the floor surface and store the debris in a debris bin 1706. In some implementations, the debris bin 1706 is removable from the robot 122 for emptying. In some implementations, the debris bin 1706 is coupled to the exhaust port 508 for evacuation by a cleaning station. In some implementations, the robot 122 does not include vacuum elements but, rather, cleans using only a cleaning pad mounted on the pad holder 126.

In some implementations, the robot 122 includes a translation mechanism operable to translate the pad holder 126 with respect to the rest of the cleaning robot 122 (e.g., with respect to a body of the cleaning robot), e.g., as described in reference to FIGS. 7A-7B. In some implementations, a control system 1700 of the robot 122 is configured to cause the drive system 1702 to translate the robot 122 with respect to a cleaning station when a cleaning pad mounted on the pad holder 126 is being washed by the cleaning station, e.g., as described in reference to FIGS. 6A-6B.

The control system 1700 can include, for example, a computing system configured to control operations of one or more components of the robot 122, e.g., by receiving data/signals from the components and providing data/signals to the components. In some implementations, the robot 122 includes a communication system 1704 configured to send and receive signals to one or more other devices, such as a cleaning station, a user device, and/or a remote computing system (e.g., a cloud computing system). For example, the communications system 1704 can transmit and receive wireless signals, such as short-range signals (e.g., Bluetooth), mid-range signals (e.g., Wi-Fi), and/or cellular network signals.

The disclosed and other examples of operations associated with pad washing, such as control operations performed by a control system (e.g., the control system 104 and/or the control system 1700) to cause fluid flow, signal transmission, roller rotation, translation, etc., can be implemented as one or more computer program products, for example, one or more modules of computer program instructions encoded on a computer readable medium for execution by, or to control the operation of, a data processing apparatus. The computer readable medium can be a machine-readable storage device, a machine-readable storage substrate, a memory device, or a combination of one or more them. The term "data processing apparatus" or "computing system" encompasses all apparatus, devices, and machines for processing data, including by way of example a programmable processor, a computer, or multiple processors or computers. The apparatus can be included in a control system. The apparatus can include, in addition to hardware, code that creates an execution environment for the computer program in question, e.g., code that constitutes processor firmware, a protocol stack, a database management system, an operating system, or a combination of one or more of them.

A system (such as a computing system) may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them. Examples of computing systems can include the control system 1700 and the control system 104.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While a number of examples have been described for illustration purposes, the foregoing description is not intended to limit the scope of the implementations disclosed herein. There are and will be other examples and modifications within the scope of the following claims.

What is claimed is:

1. A cleaning station for a mobile robot, the cleaning station comprising:

a fluid vessel;

a roller arranged in the fluid vessel, wherein the fluid vessel is shaped to hold a cleaning fluid that at least partially submerges the roller;

a conduit fluidically coupled to the fluid vessel; and a control system configured to, when the mobile robot is docked at the cleaning station, cause rotation of the roller to direct cleaning fluid from the fluid vessel to a cleaning pad of the mobile robot in order to release debris from the cleaning pad, wherein, in a cleaning cycle, the control system is configured to:

cause the cleaning fluid to flow into the fluid vessel, and cause the cleaning fluid to be withdrawn from the fluid vessel through the conduit after the cleaning fluid has been forced through the cleaning pad, and wherein the control system is configured to repeat the cleaning cycle until the cleaning cycle has repeated a threshold number of cycles or a threshold volume of the cleaning fluid has passed across the cleaning pad, wherein the threshold number of cycles or the threshold volume of the cleaning fluid is based on at least one of:

a duration of cleaning performed by the mobile robot, an area of an environment cleaned by the mobile robot, a type of cleaning performed by the mobile robot, a time duration that a floor area was not cleaned by the mobile robot, a soil level detected by the mobile robot, a type of room cleaned by the mobile robot, a current season, or current or past weather.

2. The cleaning station of claim 1, wherein the roller is translatable with respect to the mobile robot during rotation of the roller.

3. The cleaning station of claim 2, comprising a translation mechanism attached to the fluid vessel, the translation mechanism operable to translate the roller with respect to the mobile robot during rotation of the roller.

4. The cleaning station of claim 1, comprising:

a docking surface to receive the mobile robot, wherein the fluid vessel is arranged in a recess in the docking surface.

5. The cleaning station of claim 4, wherein the roller is arranged to contact the cleaning pad, and wherein the docking surface has a length that permits movement of the mobile robot through an extent of the cleaning pad when the mobile robot is docked at the cleaning station with the roller in contact with the cleaning pad.

6. The cleaning station of claim 1, wherein the control system is configured to rotate the roller such that a portion of the roller proximate the cleaning pad moves in a direction opposite a direction of relative translation between the roller and the cleaning pad.

7. The cleaning station of claim 1, wherein the roller comprises at least one of:

one or more fletches extending along a length of a surface of the roller, one or more nubs protruding from the surface of the roller, or one or more lobes that smoothly distort the surface of the roller.

8. The cleaning station of claim 1, wherein the roller comprises an elastomer.

9. The cleaning station of claim 1, wherein the roller is arranged to contact the cleaning pad when the mobile robot is docked at the cleaning station.

10. The cleaning station of claim 9, comprising a spring-loaded mounting in which the roller is mounted, wherein the spring-loaded mounting is arranged to bias the roller against the cleaning pad.

11. The cleaning station of claim 1, wherein the rotation of the roller causes the cleaning fluid to return to the fluid vessel after being directed to the cleaning pad.

12. The cleaning station of claim 1, comprising a vacuum source arranged to apply a vacuum to withdraw the cleaning fluid from the fluid vessel.

13. The cleaning station of claim 12, wherein, when the control system causes the cleaning fluid to be withdrawn, the vacuum source generates a negative pressure between 5 kPa and 30 kPa with respect to the fluid vessel.

14. The cleaning station of claim 1, wherein the cleaning fluid is withdrawn through the conduit at a velocity between 0.5 m/s and 4.0 m/s.

15. The cleaning station of claim 1, comprising a septum disposed in the conduit, the septum having a size that limits a size of debris flowing through the conduit.

16. The cleaning station of claim 1, comprising a sensor disposed in the fluid vessel and communicatively coupled to the control system, the sensor configured to measure a contamination level of the cleaning fluid in the fluid vessel, wherein the control system is configured to cause the cleaning fluid to be withdrawn from the fluid vessel in response to the contamination level being above a threshold value.

17. The cleaning station of claim 1, wherein the control system is configured to cause the cleaning fluid to flow into the fluid vessel until between 15% and 50% of a height of the roller is submerged in the cleaning fluid.

18. The cleaning station of claim 1, wherein the roller is a first roller, and wherein the cleaning station further comprises a second roller disposed in the fluid vessel or disposed in a second fluid vessel of the cleaning station.

19. A cleaning station for a mobile robot, the cleaning station comprising:

a fluid vessel;

a roller arranged in the fluid vessel, wherein the fluid vessel is shaped to hold a cleaning fluid that at least partially submerges the roller;

a conduit fluidically coupled to the fluid vessel;

a control system configured to, when the mobile robot is docked at the cleaning station, cause rotation of the roller to direct cleaning fluid from the fluid vessel to a cleaning pad of the mobile robot in order to release debris from the cleaning pad; and a sensor disposed in the fluid vessel and communicatively coupled to the control system, the sensor configured to measure a contamination level of the cleaning fluid in the fluid vessel, wherein, in a cleaning cycle, the control system is configured to:

cause the cleaning fluid to flow into the fluid vessel, and cause the cleaning fluid to be withdrawn from the fluid vessel through the conduit after the cleaning fluid has been forced through the cleaning pad, and wherein the control system is configured to repeat the cleaning cycle until the contamination level is below a threshold value at a predetermined time during the cleaning cycle.

20. The cleaning station of claim 19, wherein the roller comprises at least one of:

one or more fletches extending along a length of a surface of the roller, one or more nubs protruding from the surface of the roller, or one or more lobes that smoothly distort the surface of the roller.

21. The cleaning station of claim 19, comprising a vacuum source arranged to apply a vacuum to withdraw the cleaning fluid from the fluid vessel, wherein, when the control system causes the cleaning fluid to be withdrawn, the vacuum source generates a negative pressure between 5 kPa and 30 kPa with respect to the fluid vessel.

22. The cleaning station of claim 19, wherein the cleaning fluid is withdrawn through the conduit at a velocity between 0.5 m/s and 4.0 m/s.

23. A cleaning station for a mobile robot, the cleaning station comprising:

a fluid vessel;

a roller arranged in the fluid vessel, wherein the fluid vessel is shaped to hold a cleaning fluid that at least partially submerges the roller;

a waste tank fluidically coupled to the fluid vessel;

a dry debris canister;

a vacuum source;

a valve; and a control system configured to, when the mobile robot is docked at the cleaning station, cause rotation of the roller to direct cleaning fluid from the fluid vessel to a cleaning pad of the mobile robot in order to release debris from the cleaning pad, wherein, in a first configuration of the valve, the valve fluidically couples the vacuum source to the waste tank, such that a vacuum applied by the vacuum source draws the cleaning fluid from the fluid vessel into the waste tank, and wherein, in a second configuration of the valve, the valve fluidically couples the vacuum source to the dry debris canister, such that the vacuum applied by the vacuum source draws dry debris stored in the mobile robot into the dry debris canister.

24. The cleaning station of claim 23, comprising an intake port configured to interface with an exhaust port of the mobile robot to receive the dry debris, wherein the dry debris is vacuumed by the mobile robot.

25. The cleaning station of claim 23, comprising an air separation element configured to separate the cleaning fluid withdrawn from the fluid vessel from an airstream generated by the vacuum source, wherein the air separation element comprises a tortuous path, a chamber or conduit shaped to cause a reduction in fluid velocity, an inertial separation device, or an air-only permeable membrane.

26. The cleaning station of claim 25, comprising a drying element arranged to dry the airstream after separation of the cleaning fluid.

27. The cleaning station of claim 23, wherein the waste tank comprises a solid waste canister, a liquid waste canister, and a filter configured to:

direct or retain the cleaning fluid withdrawn from the fluid vessel in the liquid waste canister, and direct or retain the debris released from the cleaning pad in the solid waste canister.

28. A cleaning station for a mobile robot, the cleaning station comprising:

a fluid vessel;

a roller arranged in the fluid vessel, wherein the fluid vessel is shaped to hold a cleaning fluid that at least partially submerges the roller;

a waste tank;

a vacuum source;

a valve; and a control system configured to, when the mobile robot is docked at the cleaning station, cause rotation of the roller to direct cleaning fluid from the fluid vessel to a cleaning pad of the mobile robot in order to release debris from the cleaning pad, wherein, in a first configuration of the valve, the valve fluidically couples the waste tank to the fluid vessel, such that a vacuum applied by the vacuum source draws the cleaning fluid from the fluid vessel into the waste tank, and wherein, in a second configuration of the valve, the valve fluidically couples the vacuum source to an evacuation port of the mobile robot, such that the vacuum applied by the vacuum source draws dry debris stored in the mobile robot into the waste tank.

29. The cleaning station of claim 28, comprising an intake port configured to interface with an exhaust port of the mobile robot to receive the dry debris, wherein the dry debris is vacuumed by the mobile robot.

30. The cleaning station of claim 28, comprising an air separation element configured to separate the cleaning fluid withdrawn from the fluid vessel from an airstream generated by the vacuum source, wherein the air separation element comprises a tortuous path, a chamber or conduit shaped to cause a reduction in fluid velocity, an inertial separation device, or an air-only permeable membrane.

31. The cleaning station of claim 30, comprising a drying element arranged to dry the airstream after separation of the cleaning fluid.

32. The cleaning station of claim 28, wherein the waste tank comprises a solid waste canister, a liquid waste canister, and a filter configured to:

direct or retain the cleaning fluid withdrawn from the fluid vessel in the liquid waste canister, and direct or retain the debris released from the cleaning pad in the solid waste canister.

33. A cleaning station for a mobile robot, the cleaning station comprising:

a fluid vessel;

a roller arranged in the fluid vessel, wherein the fluid vessel is shaped to hold a cleaning fluid that at least partially submerges the roller;

a control system configured to, when the mobile robot is docked at the cleaning station, cause rotation of the roller to direct cleaning fluid from the fluid vessel to a cleaning pad of the mobile robot in order to release debris from the cleaning pad;

a waste tank fluidically coupled to the fluid vessel;

a solid waste canister fluidically coupled to the fluid vessel;

a vacuum source; and a filter arranged to receive a mixture of the debris and the cleaning fluid from the fluid vessel, direct the debris into the solid waste canister, and direct the cleaning fluid into the waste tank.

34. The cleaning station of claim 33, wherein the filter comprises a rinsable mesh strainer, a washable fabric filter, a disposable mesh or fabric filter, or an inertial separation device.

35. The cleaning station of claim 33, wherein the filter is configured direct the cleaning fluid into a liquid waste canister of the waste tank, and wherein the solid waste canister is located within the liquid waste canister.

36. The cleaning station of claim 33, wherein the filter is configured direct the cleaning fluid into a liquid waste canister of the waste tank, and wherein the solid waste canister is separately removable from the waste tank.

37. The cleaning station of claim 33, comprising an air separation element configured to separate the cleaning fluid withdrawn from the fluid vessel from an airstream generated by the vacuum source, wherein the air separation element comprises a tortuous path, a chamber or conduit shaped to cause a reduction in fluid velocity, an inertial separation device, or an air-only permeable membrane.

* * * * *